(12) United States Patent
Bagheri et al.

(10) Patent No.: US 11,304,077 B2
(45) Date of Patent: Apr. 12, 2022

(54) DOWNLINK ASSIGNMENTS FOR DOWNLINK CONTROL CHANNELS

(71) Applicant: Lenovo (Singapore) PTE. LTD., New Tech Park (SG)

(72) Inventors: Hossein Bagheri, Urbana, IL (US); Hyejung Jung, Northbrook, IL (US); Vijay Nangia, Woodridge, IL (US); Ravi Kuchibhotla, Clarendon Hills, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 314 days.

(21) Appl. No.: 16/536,803

(22) Filed: Aug. 9, 2019

(65) Prior Publication Data

US 2020/0053580 A1     Feb. 13, 2020

Related U.S. Application Data

(62) Division of application No. 16/536,668, filed on Aug. 9, 2019.

(Continued)

(51) Int. Cl.
*H04W 4/00*     (2018.01)
*H04W 24/08*     (2009.01)
(Continued)

(52) U.S. Cl.
CPC .......... *H04W 24/08* (2013.01); *H04L 5/0007* (2013.01); *H04L 5/0051* (2013.01); *H04L 5/10* (2013.01);
(Continued)

(58) Field of Classification Search
CPC ................................................. H04W 24/08
See application file for complete search history.

(56) References Cited

U.S. PATENT DOCUMENTS 9,131,491 B2 *   9/2015   Lee ...................... H04L 5/0055
10,524,284 B2 *   12/2019   Bagheri .............. H04W 72/044
(Continued)

FOREIGN PATENT DOCUMENTS

WO     2018083244 A1     5/2018
WO     2018129330 A1     7/2018

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

(Continued)

*Primary Examiner* — Guang W Li
(74) *Attorney, Agent, or Firm* — Kunzler Bean & Adamson

(57) ABSTRACT

Apparatuses, methods, and systems are disclosed for downlink assignments for downlink control channels. One method includes determining a third set of downlink control channel monitoring occasions that comprises first downlink control channel monitoring occasions and second downlink control channel monitoring occasions, and associated search spaces correspond to two different control resource sets comprising a first control resource set and a second control resource set, wherein: demodulation reference signal ports of the first control resource set are quasi-collocated with a first set of reference signals; demodulation reference signal ports of the second control resource set are quasi-collocated with a second set of reference signals. The method includes monitoring one or more downlink control channel candidates in at least one slot of the third set of monitoring occasions if the one or more downlink control channel candidates carry the same downlink control information.

20 Claims, 6 Drawing Sheets

Related U.S. Application Data

(60) Provisional application No. 62/716,894, filed on Aug. 9, 2018.

(51) Int. Cl.
*H04L 5/00* (2006.01)
*H04L 5/10* (2006.01)
*H04W 72/04* (2009.01)
*H04W 72/12* (2009.01)

(52) U.S. Cl.
CPC ..... *H04W 72/042* (2013.01); *H04W 72/0446* (2013.01); *H04W 72/1273* (2013.01)

(56) References Cited

U.S. PATENT DOCUMENTS

| | | | |
|---|---|---|---|
| 10,856,316 B2 * | 12/2020 | Liou | H04W 72/1289 |
| 11,057,914 B2 * | 7/2021 | You | H04L 5/0053 |
| 2011/0280201 A1 * | 11/2011 | Luo | H04W 72/0406 370/329 |
| 2013/0194931 A1 * | 8/2013 | Lee | H04W 72/04 370/241 |
| 2014/0254420 A1 * | 9/2014 | Kim | H04W 24/08 370/252 |
| 2015/0131565 A1 * | 5/2015 | Nakashima | H04L 1/0026 370/329 |
| 2015/0304995 A1 * | 10/2015 | Yi | H04L 5/0007 370/329 |
| 2017/0367046 A1 | 12/2017 | Papasakellariou | |
| 2018/0042028 A1 | 2/2018 | Nam et al. | |
| 2018/0132264 A1 * | 5/2018 | Jung | H04L 1/1812 |
| 2018/0139023 A1 * | 5/2018 | Li | H04L 5/0053 |
| 2018/0219606 A1 | 8/2018 | Ng et al. | |
| 2018/0227156 A1 * | 8/2018 | Papasakellariou | H04W 72/0453 |
| 2019/0150124 A1 * | 5/2019 | Nogami | H04W 72/14 370/330 |
| 2019/0305867 A1 * | 10/2019 | Tseng | H04W 24/10 |
| 2020/0008231 A1 * | 1/2020 | Vilaipornsawai | H04W 72/1273 |
| 2020/0100248 A1 * | 3/2020 | Kim | H04W 72/042 |
| 2020/0221428 A1 * | 7/2020 | Moon | H04B 7/024 |
| 2020/0245333 A1 * | 7/2020 | Lin | H04L 5/0051 |
| 2020/0336928 A1 * | 10/2020 | Seo | H04L 5/0048 |
| 2020/0404690 A1 * | 12/2020 | Lee | H04W 72/1273 |
| 2021/0045141 A1 * | 2/2021 | Lee | H04L 5/0053 |
| 2021/0227517 A1 * | 7/2021 | Yi | H04W 72/0453 |
| 2021/0227560 A1 * | 7/2021 | Shao | H04L 1/0025 |

OTHER PUBLICATIONS

3GPP, "3rd Generation Partnership Project; Technical Specification Group Radio Access Network; NR; Multiplexing and channel coding (Release 15)", 3GPP TS 38.212 V15.2.0, Jun. 2018, pp. 1-98.

3Gpp, "3rd Generation Partnership Project; Technical Specification Group Radio Access Network; NR; Physical channels and modulation (Release 15)", 3GPP TS 38.211 V15.2.0, Jun. 2018, pp. 1-96.

3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.

3GPP, "3rd Generation Partnership Project; Technical Specification Group Radio Access Network; NR; Physical layer procedures for data (Release 15)", 3GPP TS 38.214 V15.2.0, Jun. 2018, pp. 1-95.

3GPP, "3rd Generation Partnership Project; Technical Specification Group Radio Access Network; NR; Radio Resource Control (RRC) protocol specification (Release 15)", 3GPP TS 38.331 V15.2.0, Jun. 2018, pp. 1-304.

PCT/IB2019/000918, "Notification of Transmittal of the International Search Report and the Written Opinion of the International Searching Authority, or the Declaration", PCT International Searching Authority, dated Jan. 29, 2020, pp. 1-11.

PCT/IB2019/000904, "Notification of Transmittal of the International Search Report and the Written Opinion of the International Searching Authority, or the Declaration", PCT International Searching Authority, dated Feb. 6, 2020, pp. 1-15.

Guangdong OPPO Mobile, "PDCCH Coreset configuration and UE procedure on NR-PDCCH", R1-1710150, 3GPP TSG RAN WG1 NR Ad-Hoc#2.

U.S. Appl. No. 16/536,668, Office Action Summary, USPTO, dated Aug. 16, 2021, pp. 1-24.

* cited by examiner

DOWNLINK ASSIGNMENTS FOR DOWNLINK CONTROL CHANNELS

CROSS-REFERENCE TO RELATED APPLICATIONS

This application claims priority to U.S. patent application Ser. No. 62/716,894 entitled "APPARATUSES, METHODS, AND SYSTEMS FOR ENHANCING DOWNLINK COMMUNICATION RELIABILITY" and filed on Aug. 9, 2018 for Hossein Bagheri, which is incorporated herein by reference in its entirety.

FIELD

The subject matter disclosed herein relates generally to wireless communications and more particularly relates to downlink assignments for downlink control channels.

BACKGROUND

The following abbreviations are herewith defined, at least some of which are referred to within the following description: Third Generation Partnership Project ("3GPP"), 4$^{th}$ Generation ("4G"), 5$^{th}$ Generation ("5G"), 5G System ("5GS"), Positive-Acknowledgment ("ACK"), Aggregation Level ("AL"), Access and Mobility Management Function ("AMF"), Access Network ("AN"), Access Point ("AP"), Authentication Server Function ("AUSF"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Device-to-Device ("D2D"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), Industrial IoT ("IIoT"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multiple TRPs ("multi-TRPs"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), LTE-to-V2X Interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located or Quasi Co-Location ("QCL"), Quality of Service ("QoS"), Quadrature Phase Shift Keying ("QPSK"), Registration Area ("RA"), Radio Access Network ("RAN"), Radio Access Technology ("RAT"), Random Access Channel ("RACH"), Random Access Preamble Identity ("RAPID"), Random Access Response ("RAR"), Resource Block ("RB"), Resource Element Group ("REG"), Radio Link Control ("RLC"), Radio Link Monitoring ("RLM"), Radio Network Temporary Identifier ("RNTI"), Reference Signal or Reference Signals ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TB S"), Transmission Configuration Indicator ("TCI"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, downlink data may be received. In such networks, the downlink data may be received on a downlink channel.

BRIEF SUMMARY

Methods for downlink assignments for downlink control channels are disclosed. Apparatuses and systems also perform the functions of the apparatus. One embodiment of a method includes monitoring a first downlink control channel candidate associated with scheduling a first downlink data channel in a first control resource set. In certain embodiments, the method includes monitoring a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols. In various embodiments, the method includes receiving at least one downlink assignment associated with the first downlink control channel candidate or the second downlink control channel candidate. In some embodiments, the method includes, in response to the at least one downlink assignment comprising a first downlink assignment associated with the first downlink control channel candidate: determining a first downlink data channel allocation comprising resources allocated to a first downlink data channel based on the first downlink assignment; determining a first demodulation reference signal symbol location associated with the first downlink data channel based at least in part on the first downlink assignment, the first set of orthogonal frequency-division multiplexing symbols, and the second set of orthogonal frequency-division multiplexing symbols; and decoding the first downlink data channel. In certain embodiments, the method includes, in response to the at least one downlink assignment comprising a second downlink assignment associated with the second downlink control channel candidate: determining a second downlink data channel allocation comprising resources allocated to a second downlink data channel based on the second downlink assignment; determining a second demodulation reference signal symbol location associated with the second downlink data channel based at least in part on the second downlink assignment, the first set of orthogonal frequency-division multiplexing symbols, and the second set of orthogonal frequency-division multiplexing symbols; and decoding the second downlink data channel.

One apparatus for downlink assignments for downlink control channels includes a processor that: monitors a first downlink control channel candidate associated with scheduling a first downlink data channel in a first control resource set; and monitors a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols. In some embodiments, the apparatus includes a receiver that receives at least one downlink assignment associated with the first downlink control channel candidate or the second downlink control channel candidate. In various embodiments, in response to the at least one downlink assignment comprising a first downlink assignment associated with the first downlink control channel candidate, the processor: determines a first downlink data channel allocation comprising resources allocated to a first downlink data channel based on the first downlink assignment; determines a first demodulation reference signal symbol location associated with the first downlink data channel based at least in part on the first downlink assignment, the first set of orthogonal frequency-division multiplexing symbols, and the second set of orthogonal frequency-division multiplexing symbols; and decodes the first downlink data channel; and, in response to the at least one downlink assignment comprising a second downlink assignment associated with the second downlink control channel candidate, the processor: determines a second downlink data channel allocation comprising resources allocated to a second downlink data channel based on the second downlink assignment; determines a second demodulation reference signal symbol location associated with the second downlink data channel based at least in part on the second downlink assignment, the first set of orthogonal frequency-division multiplexing symbols, and the second set of orthogonal frequency-division multiplexing symbols; and decodes the second downlink data channel.

Another embodiment of a method for downlink assignments for downlink control channels includes receiving a first indication comprising a first search space identity and a second search space identity, wherein the first search space identity and the second search space identity are for a set of associated search spaces comprising a first search space and a second search space. In certain embodiments, the method includes determining a first set of downlink control channel monitoring occasions for the first search space. In various embodiments, the method includes determining a second set of downlink control channel monitoring occasions for the second search space. In some embodiments, the method includes determining a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different. In certain embodiments, the method includes monitoring one or more downlink control channel candidates in at least one slot of the third set of monitoring occasions if the one or more downlink control channel candidates carry the same downlink control information.

Another apparatus for downlink assignments for downlink control channels includes a receiver that receives a first indication comprising a first search space identity and a second search space identity, wherein the first search space identity and the second search space identity are for a set of associated search spaces comprising a first search space and a second search space. In some embodiments, the apparatus includes a processor that: determines a first set of downlink control channel monitoring occasions for the first search space; determines a second set of downlink control channel monitoring occasions for the second search space; determines a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different; and monitors one or more downlink control channel candidates in at least one slot of the third set of monitoring occasions if the one or more downlink control channel candidates carry the same downlink control information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
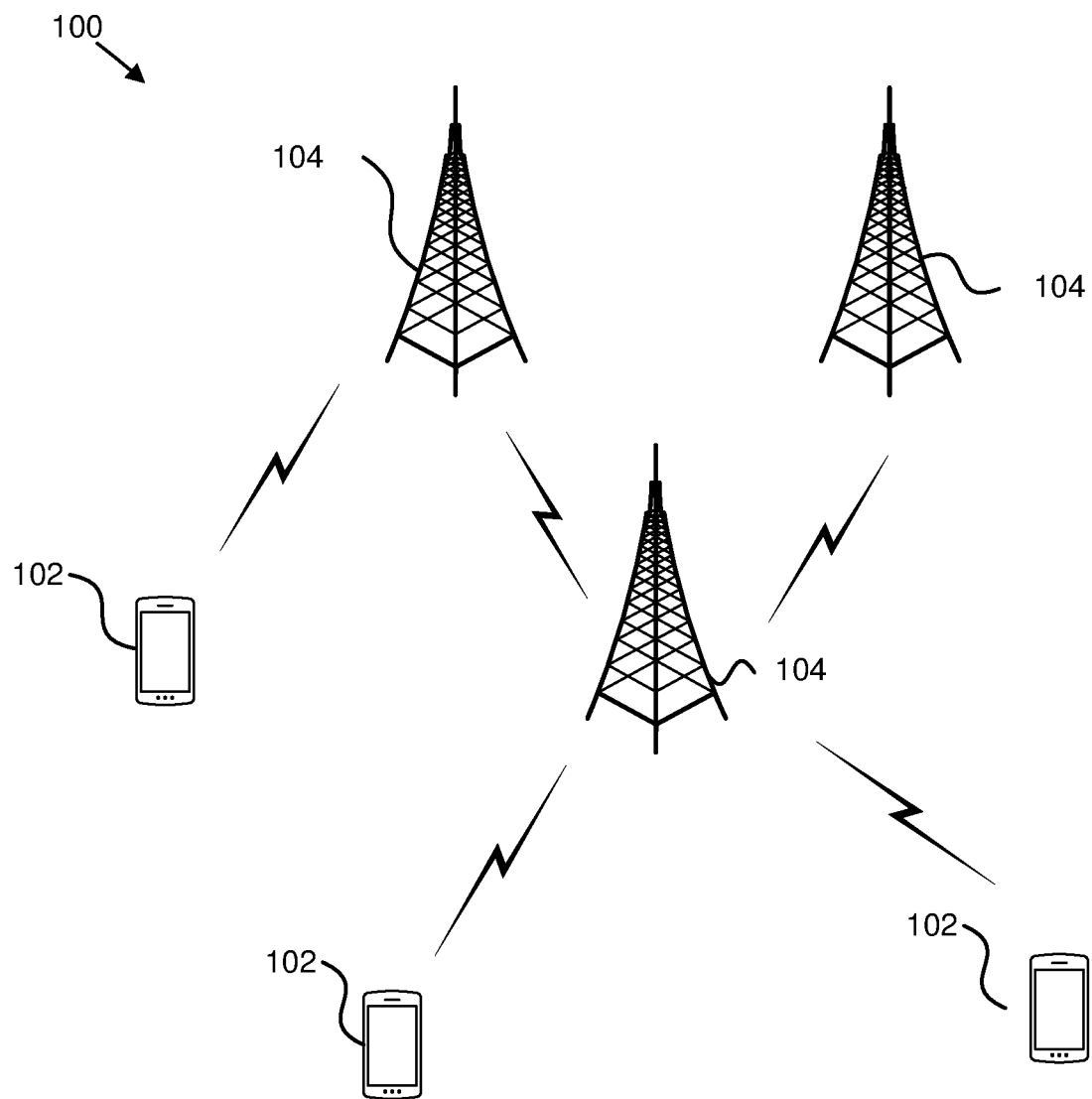
FIG. 1 is a schematic block diagram illustrating one embodiment of a wireless communication system for downlink assignments for downlink control channels.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As may be appreciated, TS 36.211 recites: "an antenna port is defined such that the channel over which a symbol on the antenna port is conveyed can be inferred from the channel over which another symbol on the same antenna port is conveyed. There is one resource grid per antenna port. The antenna ports used for transmission of a physical channel or signal depends on the number of antenna ports configured for the physical channel or signal." As used herein, demodulation reference signal ports may refer to antenna ports on which a demodulation reference signal is conveyed similar to the terminology used in TS 38.212.

FIG. 1 depicts an embodiment of a wireless communication system 100 for downlink assignments for downlink control channels. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. The remote units 102 may also communicate directly with one or more of the other remote units 102.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may monitor a first downlink control channel candidate associated with scheduling a first downlink data channel in a first control resource set. In certain embodiments, the remote unit 102 may monitor a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols. In various embodiments, the remote unit 102 may receive at least one downlink assignment associated with the first downlink control channel candidate or the second downlink control channel candidate. In some embodiments, the remote unit 102 may, in response to the at least one downlink assignment comprising a first downlink assignment associated with the first downlink control channel candidate: determine a first downlink data channel allocation comprising resources allocated to a first downlink data channel based on the first downlink assignment; determine a first demodulation reference signal symbol location associated with the first downlink data channel based at least in part on the first downlink assignment, the first set of orthogonal frequency-division multiplexing symbols, and the second set of orthogonal frequency-division multiplexing symbols; and decode the first downlink data channel. In certain embodiments, the remote unit 102 may, in response to the at least one downlink assignment comprising a second downlink assignment associated with the second downlink control channel candidate: determine a second downlink data channel allocation comprising resources allocated to a second downlink data channel based on the second downlink assignment; determine a second demodulation reference signal symbol location associated with the second downlink data channel based at least in part on the second downlink assignment, the first set of orthogonal frequency-division multiplexing symbols, and the second set of orthogonal frequency-division multiplexing symbols; and decode the second downlink data channel. Accordingly, the remote unit 102 may be used for downlink assignments for downlink control channels.

In another embodiment, a remote unit 102 may receive a first indication comprising a first search space identity and a second search space identity, wherein the first search space identity and the second search space identity are for a set of associated search spaces comprising a first search space and a second search space. In certain embodiments, the remote unit 102 may determine a first set of downlink control channel monitoring occasions for the first search space. In various embodiments, the remote unit 102 may determine a second set of downlink control channel monitoring occasions for the second search space. In some embodiments, the remote unit 102 may determine a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different. In certain embodiments, the remote unit 102 may monitor one or more downlink control channel candidates in at least one slot of the third set of monitoring occasions if the one or more downlink control channel candidates carry the same downlink control information. Accordingly, the remote unit 102 may be used for downlink assignments for downlink control channels.

Figure 2:
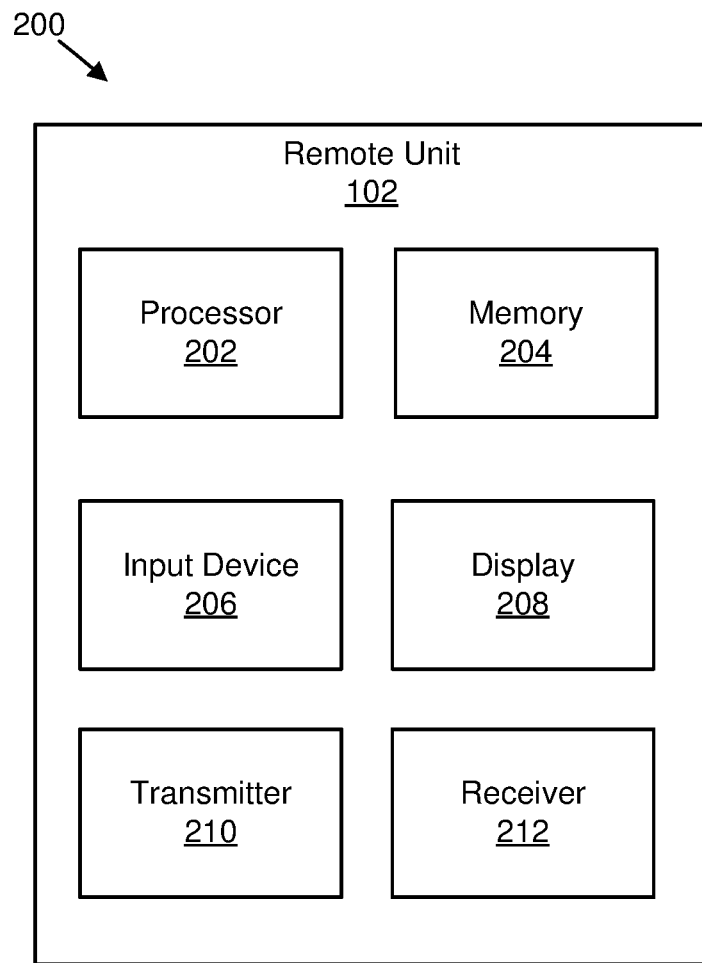
FIG. 2 is a schematic block diagram illustrating one embodiment of an apparatus that may be used for downlink assignments for downlink control channels.

FIG. 2 depicts one embodiment of an apparatus 200 that may be used for downlink assignments for downlink control channels. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: monitor a first downlink control channel candidate associated with scheduling a first downlink data channel in a first control resource set; monitor a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols; in response to at least one downlink assignment comprising a first downlink assignment associated with the first downlink control channel candidate: determine a first downlink data channel allocation comprising resources allocated to a first downlink data channel based on the first downlink assignment; determine a first demodulation reference signal symbol location associated with the first downlink data channel based at least in part on the first downlink assignment, the first set of orthogonal frequency-division multiplexing symbols, and the second set of orthogonal frequency-division multiplexing symbols; and decode the first downlink data channel; and, in response to the at least one downlink assignment comprising a second downlink assignment associated with the second downlink control channel candidate: determine a second downlink data channel allocation comprising resources allocated to a second downlink data channel based on the second downlink assignment; determine a second demodulation reference signal symbol location associated with the second downlink data channel based at least in part on the second downlink assignment, the first set of orthogonal frequency-division multiplexing symbols, and the second set of orthogonal frequency-division multiplexing symbols; and decode the second downlink data channel.

In certain embodiments, the processor 202 may: determine a first set of downlink control channel monitoring occasions for the first search space; determine a second set of downlink control channel monitoring occasions for the second search space; determine a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different; and monitor one or more downlink control channel candidates in at least one slot of the third set of monitoring occasions if the one or more downlink control channel candidates carry the same downlink control information. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives at least one downlink assignment associated with a first downlink control channel candidate or a second downlink control channel candidate. In various embodiments, the receiver 212 receives a first indication comprising a first search space identity and a second search space identity, wherein the first search space identity and the second search space identity are for a set of associated search spaces comprising a first search space and a second search space.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
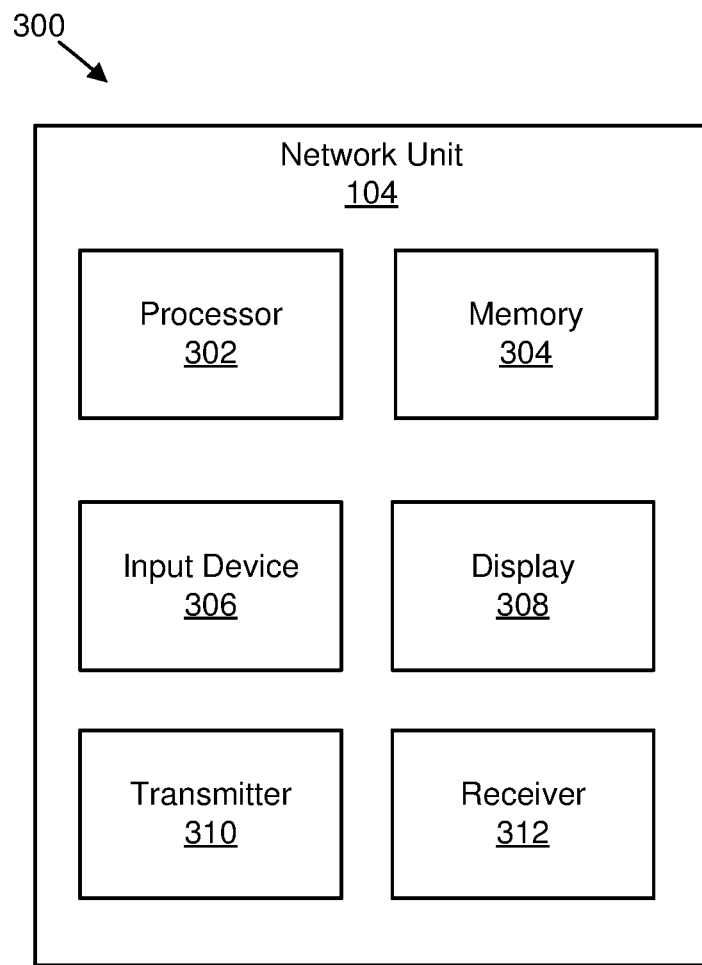
FIG. 3 is a schematic block diagram illustrating one embodiment of an apparatus that may be used for transmitting and/or receiving data and/or information.

FIG. 3 depicts one embodiment of an apparatus 300 that may be used for transmitting and/or receiving data and/or information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as IIoT applications, some factory environments may suffer from high blocking and/or penetration loss (e.g., due to heavy metal machines, special production settings, and/or deployment of multi-TRPs). In such embodiments, it may be beneficial to overcome coverage holes and enhance communication reliability.

Described herein are various methods and apparatuses in which a UE may receive multiple PDCCHs carrying the same DCI and/or the UE may receive multiple PDSCHs carrying the same TB from multiple TRPs. Furthermore, described herein are various methods and apparatuses in which a network entity may indicate to a UE an association corresponding to multiple PDCCHs and/or PDSCHs. Moreover, described herein are various methods and apparatuses in which a UE receives a PDSCH transmission (e.g., including embodiments in which PDSCH is repeated over multiple consecutive TTIs) if the corresponding PDCCH is transmitted multiple times in a time domain and/or in a frequency domain (e.g., via multiple TRPs).

In certain embodiments, a UE may not expect two PDCCH monitoring occasions for a same search space set or for different search space sets in a same control resource set to be separated by a non-zero number of symbols that is smaller than the control resource set duration. In other embodiments, there may be no such restriction for non-overlapping PDCCH monitoring occasions if a given control resource set is associated with more than one spatially differentiated downlink reference signals or antenna ports for spatial multiplexing of multiple PDCCHs and if a UE is capable of receiving multiple spatially multiplexed PDCCHs simultaneously.

In various embodiments, a PDCCH-Config IE may be used to configure UE specific PDCCH parameters such as CORESETs, search spaces, and additional parameters for acquiring the PDCCH. As may be appreciated, the search spaces may define how and/or where to search for PDCCH candidates, and each search space may be associated with one CORESET. In some embodiments, each CORESET may be semi-statically configured (or otherwise configured) with one or more TCI states, and a MAC CE may dynamically indicate an active TCI state from the configured TCI states for the CORESET. In certain embodiments, the TCI states provide information on QCL relationships between the DL RS in one RS set and PDCCH DMRS ports. In one embodiment, each CORESET has a configuration parameter tci-PresentInDCI. If at least spatial QCL is configured and/or indicated, the configuration parameter tci-PresentInDCI may indicate whether a TCI field is present in DL related DCI (e.g., a TCI indication in DCI to be applied to PDSCH scheduled by the DCI). If the configuration parameter tci-PresentInDCI is absent, a UE may consider a TCI field to be absent and/or disabled in DL related DCI.

In some embodiments, if a UE can receive multiple SS/PBCH blocks or CSI-RS resources simultaneously (e.g., on fully or partially overlapping time-domain resources), the UE may be able to simultaneously receive multiple PDCCHs, each of which is transmitted by a different TRP. As may be appreciated, receiving multiple PDCCHs carrying the same DCI content but being transmitted by multiple TRPs may increase a rate of successful DCI delivery due to time, frequency, and/or spatial diversity. In certain embodiments, if one or more PDCCHs carrying the same DCI content have a same CCE aggregation level (e.g., the same or similar channel coding rate), a UE may soft combine channel bit LLRs to improve a decoding accuracy. In various embodiments, if one or more PDCCHs carrying the same DCI content have different CCE aggregation levels, a UE may soft combine channel bit LLRs in a soft buffer because the DCI is encoded using a same base or mother channel code with a different level of rate matching resulting in different coded bit sizes corresponding to the different aggregation levels. In some embodiments, a UE may combine information bit LLRs of one or more corresponding PDCCH decoder outputs. In certain embodiments, if a UE is equipped with an advanced receiver performing iterative decoding and demodulation and two PDCCHs carrying the same DCI content have the same CCE aggregation level, channel bit extrinsic LLRs of one PDCCH decoder output may be fed to another PDCCH decoder input as priority information.

In various embodiments, a UE determines a PDCCH monitoring occasion from a PDCCH monitoring periodicity, a PDCCH monitoring offset, and a PDCCH monitoring pattern within a slot. In some embodiments, for a search space set s in a control resource set p, a UE determines that PDCCH monitoring occasions exists in a slot with number $n_{s,f}^\mu$ in a frame with number $n_f$ if $(n_f \cdot N_{slot}^{frame,\mu} + n_{s,f}^\mu - o_{p,s})$ mod $k_{p,s}=0$. In certain embodiments, if a UE is provided a higher layer parameter duration, the UE monitors PDCCH for the search space set s in the control resource set p for $T_{p,s}$ consecutive slots, starting from slot $n_{s,f}^\mu$, and does not monitor PDCCH for the search space set s in the control resource set p for the next $k_{p,s} - T_{p,s}$ consecutive slots.

In one embodiment, a UE may receive an indication that a given DCI content may be delivered via one or more associated search spaces. The indication may include a set of search space identities for the one or more associated search spaces. The indication may be signaled in a UE-specific RRC message for UE-specific search spaces and/or in a broadcast system information message for common (e.g., cell-specific) search spaces.

In various embodiments, if one or more associated search spaces include at least one common slot, a UE blindly decodes one or more PDCCHs in the at least one common slot of the one or more associated search spaces assuming that the one or more PDCCHs in the at least one common slot carry the same DCI content. In such embodiments, monitoring symbols within the at least one common slot are the same or at least overlapping (e.g., in the time-domain) for the one or more associated search spaces.

In certain embodiments, a UE may receive an indication that some or all monitoring occasions of a first search space are associated with some or all monitoring occasions of a second search space. In such embodiments, the first and second search spaces may be included in one or more associated search spaces. In some embodiments, a UE may receive additional monitoring slot periodicity indications for first and second search spaces in addition to baseline monitoring slot periodicity indications (e.g., an RRC parameter 'monitoringSlotPeriodicityAndOffset'). In such embodiments, the UE may determine associated monitoring occasions. Moreover, the UE may assume one or more PDCCHs carry the same DCI content based on additional periodicity indications. In various embodiments, if additional monitoring slot periodicities are indicated, the additional monitoring slot periodicities may be larger than baseline monitoring slot periodicities. In certain embodiments, a UE may be provided with a higher layer parameter 'duration2' (that is different from a higher layer parameter 'duration') for each associated search space. In various embodiments, the UE may assume that associated monitoring occasions occur for consecutive PDCCH monitoring slots indicated by the parameter 'duration2'. In some embodiments, the UE may assume that one or more PDCCHs carry the same DCI content if the one or more associated search spaces include a common set of monitoring symbols within a slot and the UE blindly decodes the one or more PDCCHs in at least one common slot of the one or more associated search spaces.

Figure 4:
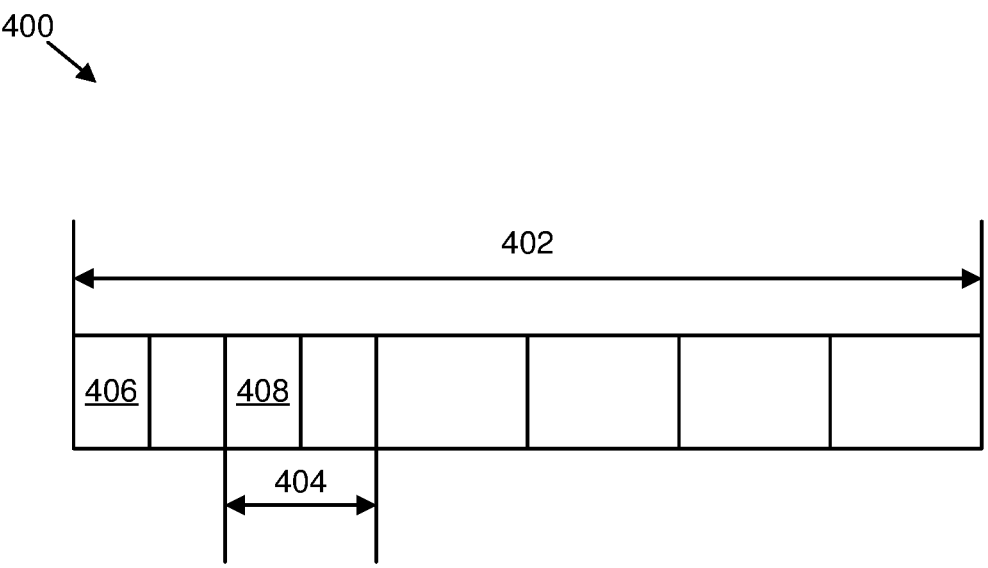
FIG. 4 is a schematic block diagram illustrating one embodiment of a first search space.
Figure 5:
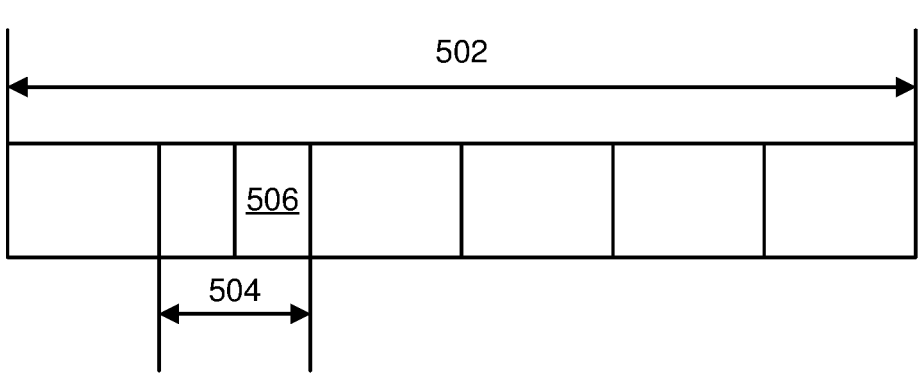
FIG. 5 is a schematic block diagram illustrating one embodiment of a second search space.

FIGS. 4 and 5 illustrate an example of associated monitoring occasions of two associated search spaces in which the associated monitoring occasions occur in a same slot but on different symbols of the same slot.

Specifically, FIG. 4 is a schematic block diagram illustrating one embodiment of a first search space 400. The first search space 400 includes a PDCCH monitoring periodicity 402 having multiple slots 404 (e.g., 6). The first search space 400 includes a first monitoring occasion 406 and a second monitoring occasion 408.

FIG. 5 is a schematic block diagram illustrating one embodiment of a second search space 500. The second search space 500 includes a PDCCH monitoring periodicity 502 having multiple slots 504 (e.g., 6). The second search space 500 includes a first monitoring occasion 506. In one example, the first search space 400 of FIG. 4 is associated with the second search space 500 of FIG. 5, and the second monitoring occasion 408 of FIG. 4 is associated with first monitoring occasion 506 of FIG. 5. As illustrated, the second monitoring occasion 408 of FIG. 4 occurs in the second slot of the PDCCH monitoring periodicity 402 and the first monitoring occasion 506 of FIG. 5 occurs in the second slot of the PDCCH monitoring periodicity 502. Furthermore, as illustrated, the second monitoring occasion 408 of FIG. 4 occurs at the beginning of the second slot of the PDCCH monitoring periodicity 402 and the first monitoring occasion 506 of FIG. 5 occurs at the end of the second slot of the PDCCH monitoring periodicity 502. Thus, the associated monitoring occasions occur in a same slot (e.g., second slot) but on different symbols of the same slot.

In some embodiments, associated search spaces are configured with a monitoring periodicity. In such embodiments, the monitoring periodicity may include a number of DL transmissions and/or repetitions of a transport block (e.g., AggregationfactorDL) if repetitions are used. In certain embodiments, a UE may not be configured with different monitoring periodicities for associated search spaces. In various embodiments, associated search spaces may have periodicities that are a multiple of one another's periodicities.

In some embodiments, if at least two sets of associated search spaces correspond to two different CORESETs, a UE may not be expected to be configured with an indication enabling a quasi-colocation information indication field to be present in DCI (e.g., an indication for a presence or absence of a TCI field for DCI format 1_1 transmitted by a PDCCH, a higher layer parameter TCI-PresentInDCI). In such embodiments, a parameter TCI-PresentInDCI='enabled'.

In certain embodiments, if at least two sets of associated search spaces correspond to two different CORESETs of a serving cell, a UE may not be expected to receive TCI state indications (e.g., via MAC CE) for PDCCH indicating different TCI states (e.g., TCI-StateId or TCI-State Configuration) for the CORESETs: a) if the UE monitors PDCCH candidates for certain DCI formats (e.g., DCI format 1_0 in the associated search spaces; and/or (b) if tci-PresentInDCI is not configured for the CORESETs.

In various embodiments, a UE is not expected to be configured with associated search spaces that all correspond to the same CORESET for multi-TRP PDCCH transmissions (e.g., each TRP corresponds to a different CORESET). In some embodiments, if a UE is configured with a higher layer parameter tci-PresentInDCI that is set as 'enabled' for a CORESET scheduling a PDSCH, the UE assumes that the TCI field is present in the DCI format 1_1 of the PDCCH transmitted on the CORESET. In certain embodiments, if tci-PresentInDCI is not configured for a CORESET scheduling a PDSCH or a PDSCH is scheduled by a DCI format 1_0, for determining PDSCH antenna port QCL a UE assumes that a TCI state for the PDSCH is identical to the TCI state applied for the CORESET used for the PDCCH transmission.

In some embodiments, if a gNB uses two or more CORESETs (e.g., CORESET 1, and CORESET 2) to schedule a PDSCH (e.g., scheduling DCI is repeated in multiple CORESETs): 1) if a UE is configured with a higher layer parameter tci-PresentInDCI that is set as 'enabled' for both CORESETs 1 and 2 scheduling the PDSCH, the UE assumes the TCI field is present in the DCI format (e.g., DCI format 1_1) of the PDCCH transmitted on CORESETs 1 and 2 (because the gNB may not know which one of the two PDCCHs the UE would receive the gNB may use the same TCI field value in both PDCCHs for the PDSCH); and/or 2) if the UE is configured with the higher layer parameter tci-PresentInDCI that is set as 'enabled' for CORESET 1 and not for CORESET 2 scheduling the PDSCH or if tci-PresentInDCI is not configured for any of the CORESETs which schedule the PDSCH, for determining PDSCH antenna port QCL, the UE assumes that the TCI state for the PDSCH is identical to one of the following: a) the TCI state applied for one of the CORESETs used for the PDCCH transmission (the CORESET ID of the one CORESET may be indicated to the UE via higher layer or physical layer signaling); and/or b) the TCI state applied for any of the CORESETs used for the PDCCH transmission, wherein all the CORESETs used for the PDCCH transmission have the same TCI applied.

In certain embodiments, a UE is configured with a search space associated with a CORESET that has more than one active TCI state at a given time instance and more than one higher layer parameter 'pdcch-DMRS-ScramblingID' for scrambling PDCCH channel bits before modulation. In such embodiments, each 'pdcch-DMRS-ScramblingID' is associated with a different active TCI state. In various embodiments, the UE assumes that one or more PDCCHs blindly decoded with different scrambling identities (e.g., 'pdcch-DMRS-ScramblingID') at a given monitoring occasion of the search space are associated (e.g., carry the same DCI content). In one embodiment, a CORESET has two active TCI states at a given time instance, and a MAC CE carrying a TCI state indication for UE-specific PDCCH has 24 bits with fields shown in Table 1, wherein 'R' denotes reserved bits setting to "0" and 'BWP ID' and 'Serving Cell ID' denote a bandwidth part identity of a downlink bandwidth part and a serving cell identity, respectively, for which the MAC CE applies.

TABLE 1

TCI State Indication for UE-Specific PDCCH MAC CE

| R | Serving Cell ID | BWP ID |
|---|---|---|
| CORESET ID | | TCI State ID 1 |
| R | | TCI State ID 2 |

As may be appreciated, embodiments described herein to determine monitoring occasions of one or more associated search spaces in which a UE may assume that one or more decoded PDCCHs carry the same DCI content are also applicable to embodiments in which the UE assumes that the one or more decoded PDCCHs in the determined monitoring occasions schedule PDSCHs carrying the same TB.

In certain embodiments, similar to multi-TRP PDCCH transmissions (e.g., in which multiple PDCCHs carrying the same DCI are transmitted by multiple TRPs), multiple PDSCHs carrying a same TB or TBs may be transmitted by the multiple TRPs to improve a reliability of a UE's PDSCH reception. In such embodiments, if association of the multiple PDSCHs carrying the same TBs is known to the physical layer, the UE may soft combine channel bit LLRs or information bit LLRs to improve decoding accuracy. Furthermore, in some embodiments, a UE may transmit one HARQ-ACK feedback for each TB instead of multiple HARQ-ACK feedbacks for multiple PDSCHs, thereby saving UE power consumption.

In some embodiments, a UE may receive an indication that a given TB from a network entity may be delivered to the UE via one or more PDSCHs at each HARQ transmission or re-transmission stage. In such embodiments, the one or more PDSCHs may be scheduled by one or more corresponding PDCCHs or scheduled by one PDCCH.

In various embodiments, a UE receives an indication of one or more associated search spaces in which one or more PDCCHs decoded in all or some monitoring occasions of the one or more associated search spaces schedule one or more PDSCHs carrying the same TB, respectively. In such embodiments, the UE may determine the monitoring occasions of the one or more associated search spaces. As may be appreciated, the UE may assume association of one or more decoded PDCCHs as described herein in relation to various associations.

In certain embodiments, a UE may be semi-statically configured (e.g. via RRC signaling) with an operating mode of TB duplication for which the UE receives one or more PDSCHs for a given TB at a given HARQ transmission (or retransmission) stage. In some embodiments, if a UE receives multiple PDCCHs carrying a same HARQ process number in DL assignment DCI (e.g., DCI format 1_0 or DCI format 1_1) within a monitoring occasion window (e.g., a set of consecutive monitoring occasions) of at least one search space, the UE assumes that the multiple PDCCHs schedule multiple associated PDSCHs carrying the same TBs.

In various embodiments, although a UE decodes multiple associated PDCCHs, the UE may decode only a subset of corresponding PDSCHs, depending on success or failure of CRC decoding of PDSCHs decoded earlier. In one example, a PDSCH having an earliest starting symbol among associated PDSCHs is successfully decoded. The UE then stop decoding other associated PDSCHs. Moreover, the UE sends one or more negative acknowledgements for one or more TBs only if the UE fails to decode the one or more TBs in all associated PDSCHs scheduled by all detected associated PDCCHs. Furthermore, the UE sends one or more acknowledgements for one or more TBs if the UE successfully decodes the one or more TBs in at least one PDSCH of the associated PDSCHs scheduled by the detected associated PDCCHs. In this example, the UE may receive indications of multiple HARQ-ACK resources with each resource corresponding to each PDSCH of the associated PDSCHs. Moreover, the UE may select a HARQ-ACK resource from the indicated HARQ-ACK resources that has the earliest starting symbol and still provides enough time budget for UE's processing delay.

In certain embodiments, for improving reliability of PDSCH DL data transmission, a gNB may repeat the PDSCH DL data transmission multiple times (e.g., in multiple slots and/or mini-slots), referred to as 'n' herein. The number of repetitions (e.g., including the initial transmission) may be configured by higher layer signaling. In some embodiments, a PDSCH-Config IE may be used to configure UE specific PDSCH parameters such as pdsch-AggregationFactor that indicates 'n'. As used herein, a PDSCH transmission duration over multiple TTIs is referred to as a reception window (e.g., a PDSCH reception window).

In some embodiments, if a UE is configured with aggregationFactorDL>1, the same symbol allocation is applied across the aggregationFactorDL consecutive slots. In such embodiments, the UE may expect that a TB is repeated within each symbol allocation among each of the aggregationFactorDL consecutive slots and the PDSCH is limited to a single transmission layer. It should be noted that the parameter 'n' is referred to as aggregationFactorDL in TS 38.214 and pdsch-AggregationFactor in TS 38.331.

In certain embodiments, PDSCH repetitions are enabled by RRC configuration. In various embodiments, there may be a field in DCI that indicates a number of PDSCH transmissions k associated with the DCI, where k>=1. In some embodiments, PDCCH indicates a number of PDSCH transmissions associated with the PDCCH. As may be appreciated, PDCCH may or may not be transmitted with a PDSCH repetition. In certain embodiments, PDSCH transmissions may be soft combined after a PDCCH is successfully received. In such embodiments, the UE may discard any PDSCH assignment for TTIs in a serving cell with CRC scrambled with C-RNTI if PDSCH is being received (e.g., by repetition or blind repetition) in the TTIs in the same serving cell.

In various embodiments, a subset of TCI states defined in TCI states are used for providing QCL relationships between the DL RS in one RS set (e.g., TCI state) and the PDCCH DMRS ports. In some embodiments, a network configures at most maxNrofTCI-StatesPDCCH entries. In certain embodiments, if a UE has received a MAC CE activation command for one TCI state, the UE applies the activation command 3 msec after a slot in which the UE transmits HARQ-ACK information for the PDSCH providing the activation command.

In some embodiments, if a UE has started reception of a PDSCH in a reception window, a DCI indicates reception of PDSCH (e.g., the same TB) in multiple TTIs (e.g., slots and/or mini-slots) in the reception window. In such embodiments, the UE does not apply an activation command in the middle of the reception window. In such embodiments, the UE may apply the activation command at least 3 msec after a slot in which the UE transmits HARQ-ACK information for the PDSCH providing the activation command, and not during a reception window. As may be appreciated, such an embodiment may be useful if PDCCH scheduling multiple PDSCH repetitions is transmitted in multiple TTIs and multiple of those PDCCHs (transmitted in different TTIs) may be soft combined.

In certain embodiments, a UE RX beam for PDSCH may be QCLed with the TCI state indicated in DCI if a time duration between an end of PDCCH and a beginning of PDSCH is longer than the threshold value (e.g., if the UE has enough time to switch RX beams). In such embodiments, if there is not enough time to switch RX beams, the UE RX beam may be the same as the TCI state of PDCCH of the lowest CORESET ID in the latest slot. In one example, if there is not enough time to switch RX beams, the UE RX beam is the same as the TCI state of PDCCH of the CORESET in which the PDCCH DCI is received in the latest slot. If there is no QCL configured, the UE RX beam may not be relevant. Thus, a time duration between an end of PDCCH and a beginning of PDSCH may not matter for applying QCL information. In some embodiments, given a UE RX beam switching time (e.g., {7, 14, 28} symbols for 60 KHz SCS and {14, 28} symbols for 120 KHz SCS), it may be assumed that the UE does not switch RX beams during reception of PDSCH repeated over consecutive symbols and/or slots. Therefore, in certain embodiments, if there is PDSCH repetition, one or more of the following may apply during the PDSCH repetition: the UE may not expect and/or perform a TCI change; the UE is not expected to receive a PDCCH indicating a TCI change; a gNB is not expected to change the TCI; and/or the UE is not expected to receive indications of different values of TCI-StateId (e.g., identify of a TCI-State configuration) for PDSCH or different TCI-State configuration for PDSCH in the multiple PDCCH DCI associated with the PDSCH repetitions. In some embodiments, the UE may apply a recently indicated TCI update after an end of a PDSCH repetition window.

In some embodiments, a UE may switch RX beams during reception of PDSCH repeated over consecutive slots in certain beam change time units (e.g., every slot or every two slots). For example, if the PDSCH is repeated over two slots in TTIs having mini-slots units (e.g., a mini-slot TTI can be four symbols, and PDSCH can be repeated over two slots 6 times—in 6 mini-slots), the UE may be able to change its RX beam in the second slot of the two repetition slot.

In certain embodiments, a UE may get a physical layer signal (e.g., a PDCCH at the beginning of each slot of the PDSCH repetitions for PDSCH repetition using mini-slot TTIs), to indicate if a TCI needs to be updated for PDSCH repetitions in TTIs within a slot In various embodiments, a network may activate and/or deactivate configured TCI states for PDSCH of a serving cell by sending a TCI states activation and/or deactivation command for UE-specific PDSCH MAC CE. In some embodiments, configured TCI states for PDSCH may be initially deactivated upon configuration and after a handover.

In certain embodiments, if there is a TCI state with a TCI state ID 'i', this field may indicate an activation and/or deactivation status of the TCI state with TCI state ID 'i'. If there is not a TCI state with a TCI state ID 'i', a MAC entity may ignore the $T_i$ field. In some embodiments, the $T_i$ field is set to "1" to indicate that the TCI state with TCI state ID 'i' is to be activated and mapped to a codepoint of the DCI Transmission Configuration Indication field. In various embodiments, the $T_i$ field is set to "0" to indicate that the TCI state with TCI state ID 'i' is to be deactivated and is not mapped to the codepoint of the DCI Transmission Configuration Indication field. In certain embodiments, the codepoint to which the TCI state is mapped is determined by its ordinal position among all the TCI states with $T_i$ field set to "1" (e.g., the first TCI state with $T_i$ field set to "1" may be mapped to the codepoint value 1, second TCI state with $T_i$ field set to "1" may be mapped to the codepoint value 2, and so forth). In various embodiments, a maximum number of activated TCI states is 8.

In some embodiments, an activation and/or deactivation MAC CE may change an interpretation (e.g., update a mapping of the TCI state with TCI state ID to codepoint in the DCI TCI field) of the TCI field in the DCI scheduling the PDSCH. In certain embodiments, a time that a UE applies the MAC CE may be dependent on the time that the UE acknowledges the PDSCH carrying the MAC CE plus a certain fixed time (e.g., 3 msec after the UE sends the acknowledgment). In various embodiments, a UE is not expected to change an interpretation of the TCI field in DCI in the middle of a PDSCH reception window. In certain embodiments, a UE is not expected to acknowledge an indication that would change a downlink RS set that is used as a QCL reference with a PDSCH in the middle of a PDSCH reception window (e.g., in case of PDSCH repetition over multiple TTIs).

In various embodiments, a UE is not expected to receive indications of different values of TCI-StateId (e.g., identify of a TCI-State configuration) for PDSCH or different TCI state configuration for PDSCH in the multiple PDCCH DCI associated with the PDSCH repetitions. In one example, the UE is not expected to receive an indication indicating a first value of a TCI state ID in a DCI of a first PDCCH associated with a first PDSCH transmission and a second value of TCI state ID in a DCI of a second PDCCH associated with a second PDSCH transmission. In this example, the first value is different from the second value. In another example, a first PDCCH is in a first search space and/or first CORESET, and a second PDCCH is in a second search space and/or second CORESET. In a further example, a first PDCCH is received in a first time instance (e.g., slot and/or mini-slot) and a second PDCCH is received in second time instance. The first PDSCH transmission and the second PDSCH transmission may be overlapping or non-overlapping in time.

In certain embodiments, a network transmits: 1) a first PDCCH in a first TTI scheduling a PDSCH; and 2) a second PDCCH in a second TTI scheduling the PDSCH; such that a) the TCI field in the DCI of the first PDCCH indicates an RS set (or beam) that is QCL with the first PDSCH; and b) the DCI of the second PDCCH indicates the RS set (or beam) that is QCL with the second PDSCH. In such embodiments, as a result that the DCI of the first PDCCH may indicate a first TCI field value and the DCI of the second PDCCH may indicate a second TCI field value, and the first and the second TCI field values may be different because of changing the interpretation of the TCI field in the DCI, but both first and second PDCCHs point to the same RS set (or beam) or the same TCI-StateId or TCI-State configuration. If a gNB cannot send the second DCI pointing to the same RS set, the gNB is not expected to transmit the second PDCCH.

In various embodiments, there may be a field in DCI indicating whether an updated TCI field interpretation indication by MAC CE (which has not yet been applied by the UE as the time required after sending the acknowledgment for the MAC CE has not yet elapsed) can be applied (if any) during the duration of PDSCH scheduling or within the PDSCH reception window (e.g., after the first slot/mini-slot PDSCH transmission). Such embodiments may be useful, for example, if the gNB schedules the UE for multiple TTIs, and sends the PDCCH scheduling the UE in some of the multiple TTIs, and does not know in which TTI the UE would receive the PDCCH (the number of PDSCH repetitions 'k' may be different depending on which TTI of the multiple TTIs with PDCCH the scheduling DCI is correctly received by the UE).

In certain embodiments, for PDSCH mapping type B, a DMRS location may be dependent on a CORESET duration (e.g., span of the CORESET in number of OFDM symbols). For example, according to TS 38.211: the positions of the DMRS symbols is given by $\bar{l}$ and, for PDSCH mapping type A, the duration is between the first OFDM symbol of the slot and the last OFDM symbol of the scheduled PDSCH resources in the slot, for PDSCH mapping type B, the duration is the number of OFDM symbols of the scheduled PDSCH resources as signaled.

For PDSCH mapping type B, if the PDSCH duration is 2, 4, or 7 OFDM symbols for normal cyclic prefix or 2, 4, 6 OFDM symbols for extended cyclic prefix, and the PDSCH allocation collides with resources reserved for a CORESET, $\bar{l}$ shall be incremented such that the first DM-RS symbol occurs immediately after the CORESET and; if the PDSCH duration is 4 symbols, the UE is not expected to receive a DM-RS symbol beyond the third symbol; if the PDSCH duration is 7 symbols for normal cyclic prefix or 6 symbols for extended cyclic prefix, the UE is not expected to receive the first DM-RS beyond the fourth symbol, and if one additional single-symbol DM-RS is configured, the UE only expects the additional DM-RS to be transmitted on the 5th or 6th symbol when the front-loaded DM-RS symbol is in the 1st or 2nd symbol, respectively, of the PDSCH duration, otherwise the UE should expect that the additional DM-RS is not transmitted. if the PDSCH duration is 2 or 4 OFDM symbols, only single-symbol DM-RS is supported.

In certain embodiments, if PDCCH is transmitted in at least two CORESETs with different durations (e.g., the two CORESETS are partially overlapping) or if a UE monitors two CORESETs with different durations for scheduling a PDSCH (or transport block), and if the two CORESETs collide with a PDSCH allocation, PDSCH-DMRS location may be determined based on the CORESET ending in a later symbol in the slot (e.g., the larger CORESET duration may end in a later symbol than the smaller duration CORESET). That is, $\bar{l}$ shall be incremented such that the first DM-RS symbol occurs immediately after the CORESET ending in the later symbol. The duration may refer to the time span of the CORSET in case different CORESETs have different subcarrier spacing.

In certain embodiments, PDSCH reception may depend on a CORESET in which scheduling DCI is received. In various embodiments, if a UE monitors PDCCH candidates for certain DCI formats (e.g., DCI format 1_0) in search spaces corresponding to more than one CORESET, one or more of the following solutions may be used if PDSCH reception (e.g., determination of PDSCH reception parameters) depends on the CORESET in which the scheduling DCI is received: 1) by higher layer signaling, the UE is provided an indication of which CORESET should be used for determination of PDSCH reception parameters (e.g., RB numbering starts from the lowest RB of the indicated CORESET); 2) the scheduling DCI may indicate which CORESET index should be used; 3) the CORESET with lowest and/or highest index among the CORESETs used for monitoring the scheduling DCI; 4) the CORESET with a fixed CORESET index (e.g., CORESET 0) is used; 5) the CORESET signaled in PBCH is used; and 6) the lowest CORESET index in the latest slot and/or mini-slot.

In some embodiments, for a PDSCH scheduled with a DCI format 1_0 in any type of PDCCH common search space, regardless of which bandwidth part is the active bandwidth part, RB numbering may start from a lowest RB of a CORESET in which the DCI was received. In such embodiments, for a PDSCH scheduled otherwise, if a bandwidth part indicator field is not configured in the scheduling DCI, the RB indexing for downlink type 0 and type 1 resource allocation is determined within the UE's active bandwidth part. If a bandwidth part indicator field is configured in the scheduling DCI, the RB indexing for downlink type 0 and type 1 resource allocation is determined within the UE's bandwidth part indicated by bandwidth part indicator field value in the DCI. The UE may upon detection of PDCCH intended for the UE determine first the downlink carrier bandwidth part and then the resource allocation within the bandwidth part.

In various embodiments, there may be instances in which PUCCH transmission (e.g., to provide acknowledgment feedback in response to PDSCH transmissions) is dependent on received PDCCH scheduling corresponding PDSCH.

In certain embodiments, if a UE is configured with multiple PDCCH reception for a TB in a same CORESET in a same TTI, the PUCCH resource (or a parameter of the PUCCH resource) may be signaled in DCI or by higher layers or a combination of both (e.g., that would result in the same PUCCH resource used for HARQ-ACK feedback for the TB irrespective of which PDCCH of the multiple PDCCH is correctly received and/or decoded by the UE).

In some embodiments, if a UE is configured with multiple PDCCH reception for a TB in different CORESETs in a same TTI or in different TTIs (e.g., in embodiments in which PDSCH is repeated in multiple TTIs, and PDCCH is also transmitted in more than one TTI), one or more of the following may apply: 1) the PUCCH resource (or a parameter of the PUCCH resource) may be signaled in DCI or by higher layers or a combination of both; 2) the number of CCEs in a control resource set of PDCCH reception (e.g., $N_{CCE,0}$) is determined based on one or more of the following methods: a) by higher layer signaling, the UE is indicated which CORESET should be used for determination of the number of CCEs; b) the scheduling DCI may indicate which CORESET index should be used (e.g., in case the PDCCHs carrying the same DCI are linked to each other (i.e., the UE knowing a PDCCH candidate in a first CORESET can determine the linked PDCCH candidate in another CORESET) and sent in different CORESETs); c) the CORESET with lowest and/or highest index among the CORESETs used for monitoring the scheduling DCI; d) the CORESET with a fixed CORESET index (e.g., CORESET 0) is used; e) the CORESET signaled in PBCH is used; and/or f) the lowest CORESET index in the latest slot and/or mini-slot.

In certain embodiments, if a UE monitors a DCI (e.g., scheduling a PDSCH) with a certain DCI format in multiple CORESETS, the UE is not expected to determine different (e.g., more than one) PUCCH resources for transmitting the acknowledgement associated with the PDSCH.

In various embodiments, if a UE monitors a DCI (e.g., scheduling a PDSCH) with a certain DCI format in multiple CORESETS with different number of total CCEs, the UE is not expected to be scheduled with PDCCHs resulting in different values of $$\left\lfloor \frac{2 \cdot n_{CCE}}{N_{CCE}} \right\rfloor$$

(e.g., the gNB sends either all the PDCCHs assigning the same PDSCH in CCEs starting from a CCE index in the top half of the CCEs of their CORESETs, or in CCEs starting from a CCE index in the bottom half of the CCEs of their CORESETs). In some embodiments, a gNB, may schedule a UE for a PDSCH by sending a first PDCCH in a first CORESET and a second PDCCH in a second CORESET, wherein: a) the starting CCE index of the first PDCCH is in the first half of the CCE indices of the first CORESET and the starting CCE index of the second PDCCH is in the first half of the CCE indices of the second CORESET; or b) the starting CCE index of the first PDCCH is in the second half of the CCE indices of the first CORESET and the starting CCE index of the second PDCCH is in the second half of the CCE indices of the second CORESET.

In some embodiments, a DCI scheduling a high reliability PDSCH contains a larger bit field for indicating a corresponding PUCCH than the DCI scheduling a regular reliability PDSCH (e.g., 4 bits instead of 3 bits in DCI is used).

Figure 6:
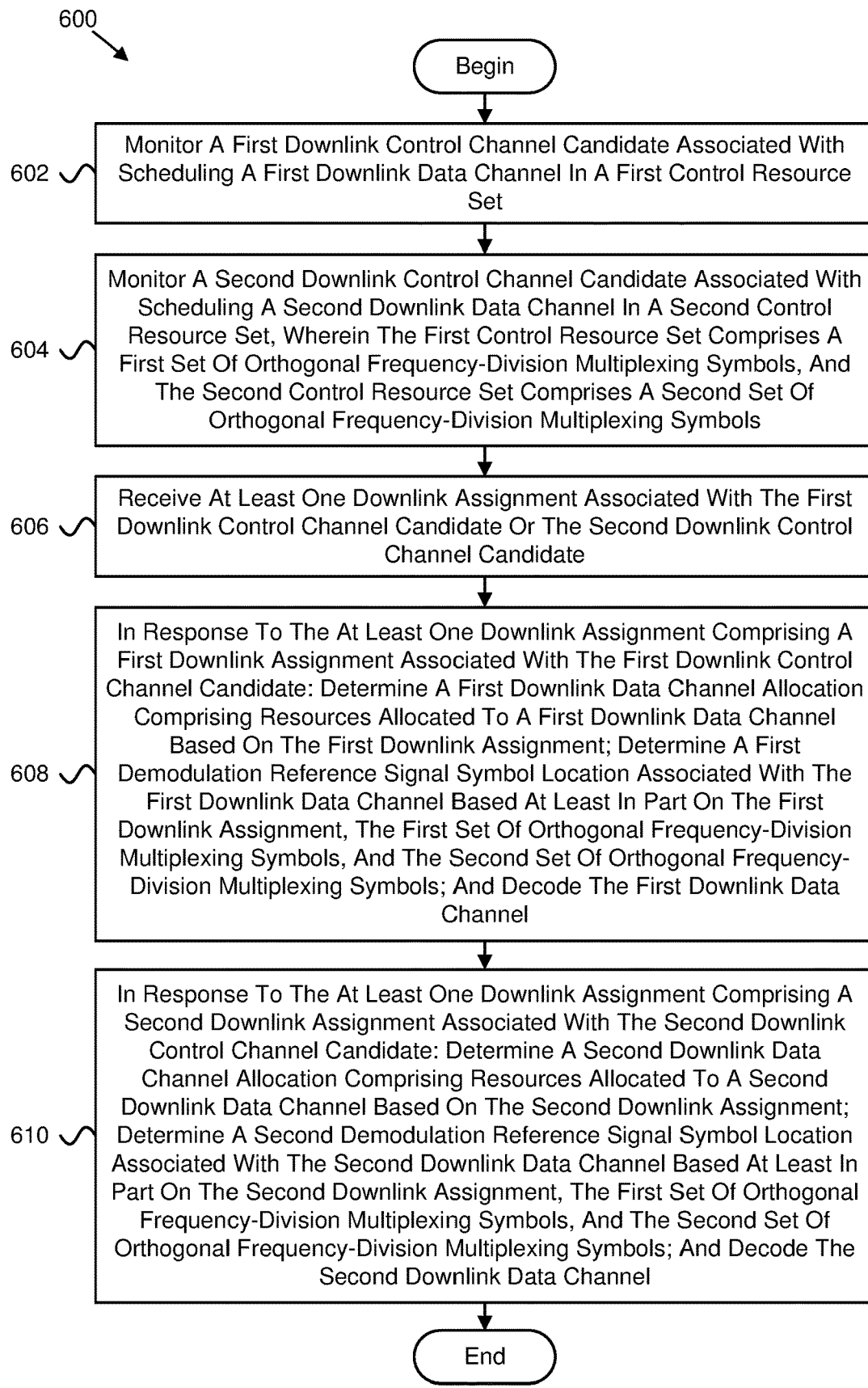
FIG. 6 is a flow chart diagram illustrating one embodiment of a method for downlink assignments for downlink control channels.

FIG. 6 is a flow chart diagram illustrating one embodiment of a method 600 for downlink assignments for downlink control channels. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include monitoring 602 a first downlink control channel candidate associated with scheduling a first downlink data channel in a first control resource set. In certain embodiments, the method 600 includes monitoring 604 a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols. In various embodiments, the method 600 includes receiving 606 at least one downlink assignment associated with the first downlink control channel candidate or the second downlink control channel candidate. In some embodiments, the method 600 includes, in response to the at least one downlink assignment comprising a first downlink assignment associated with the first downlink control channel candidate: determining 608 a first downlink data channel allocation comprising resources allocated to a first downlink data channel based on the first downlink assignment; determining a first demodulation reference signal symbol location associated with the first downlink data channel based at least in part on the first downlink assignment, the first set of orthogonal frequency-division multiplexing symbols, and the second set of orthogonal frequency-division multiplexing symbols; and decoding the first downlink data channel. In certain embodiments, the method 600 includes, in response to the at least one downlink assignment comprising a second downlink assignment associated with the second downlink control channel candidate: determining 610 a second downlink data channel allocation comprising resources allocated to a second downlink data channel based on the second downlink assignment; determining a second demodulation reference signal symbol location associated with the second downlink data channel based at least in part on the second downlink assignment, the first set of orthogonal frequency-division multiplexing symbols, and the second set of orthogonal frequency-division multiplexing symbols; and decoding the second downlink data channel.

In certain embodiments, the first demodulation reference signal symbol location and the second demodulation reference signal symbol location are the same location. In some embodiments, at least one of the first downlink data channel allocation and the second downlink data channel allocation collides with resources reserved for at least one of the first control resource set and the second control resource set. In various embodiments, the first set of orthogonal frequency-division multiplexing symbols and the second set of orthogonal frequency-division multiplexing symbols have a different number of orthogonal frequency-division multiplexing symbols.

In one embodiment, the first downlink data channel allocation and the second downlink data channel allocation overlap. In certain embodiments, the method 600 further comprises: determining a control resource set of the first control resource set and the second control resource set that ends in a later orthogonal frequency-division multiplexing symbol; determining a first demodulation reference signal symbol associated with the first downlink data channel that occurs immediately after the control resource set; and determining a second demodulation reference signal symbol associated with the second downlink data channel that occurs immediately after the control resource set.

In some embodiments, the method 600 further comprises determining a physical uplink control channel resource for sending an acknowledgement in response to the first downlink data channel and the second downlink data channel, wherein the physical uplink control channel resource is determined based on a frequency location of the at least one downlink assignment within an associated control resource set, the first control resource set comprises a first set of control channel elements, and the second control resource set comprises a second set of control channel elements.

In various embodiments, the at least one downlink assignment comprises the first downlink assignment and the second downlink assignment, and wherein: a first starting control channel element index of the first downlink control channel candidate is in a first half of a first control channel element index of the first control resource set and a second starting control channel element index of the second downlink control channel candidate is in a first half of a second control channel element index of the second control resource set; or the first starting control channel element index is in a second half of the first control channel element index and the second starting control channel element index is in a second half of the second control channel element index.

In one embodiment, a first number of control channel elements in the first set of control channel elements is different from a second number of control channel elements in the second set of control channel elements. In certain embodiments, the at least one downlink assignment comprises the first downlink assignment and the second downlink assignment, and the physical uplink control channel resource is determined based on the frequency location of the first downlink assignment. In some embodiments, the first downlink assignment and the second downlink assignment have the same content.

In various embodiments: the first downlink data channel is associated with a first transmission configuration index state and the second downlink data channel is associated with a second transmission configuration index state; the first downlink data channel comprises a third set of orthogonal frequency-division multiplexing symbols, and the second downlink data channel comprises a fourth set of orthogonal frequency-division multiplexing symbols; the first transmission configuration index state and the second transmission configuration index state are different at least if the fourth set of orthogonal frequency-division multiplexing symbols occurs at least 'w' orthogonal frequency-division multiplexing symbols after the last orthogonal frequency-division multiplexing symbol of the third set of orthogonal frequency-division multiplexing symbols, and wherein 'w' is a non-negative number determined by a user equipment; the first transmission configuration index state and the second transmission configuration index state are the same if the fourth set of orthogonal frequency-division multiplexing symbols do not occur at least 'w' orthogonal frequency-division multiplexing symbols after the last orthogonal frequency-division multiplexing symbol of the third set of orthogonal frequency-division multiplexing symbols; and the first transmission configuration index state and the second transmission configuration index state provide information comprising quasi-co-location relationships between downlink reference signals in one reference signal set and demodulation reference signal ports of a corresponding downlink data channel.

In one embodiment: the third set of orthogonal frequency-division multiplexing symbols comprises 2, 4, or 7 orthogonal frequency-division multiplexing symbols; and the fourth set of orthogonal frequency-division multiplexing symbols comprises 2, 4, or 7 orthogonal frequency-division multiplexing symbols. In certain embodiments, the first control resource set and the second control resource set are the same, and the first downlink assignment and the second downlink assignment are the same. In some embodiments, the first transmission configuration index state and the second transmission configuration index state are different if the third set of orthogonal frequency-division multiplexing symbols belong to a first slot and the fourth set of orthogonal frequency-division multiplexing symbols belong to a second slot, the first slot and the second slots are different, and a slot is composed of fourteen consecutive orthogonal frequency-division multiplexing symbols with a predetermined starting orthogonal frequency-division multiplexing symbol.

Figure 7:
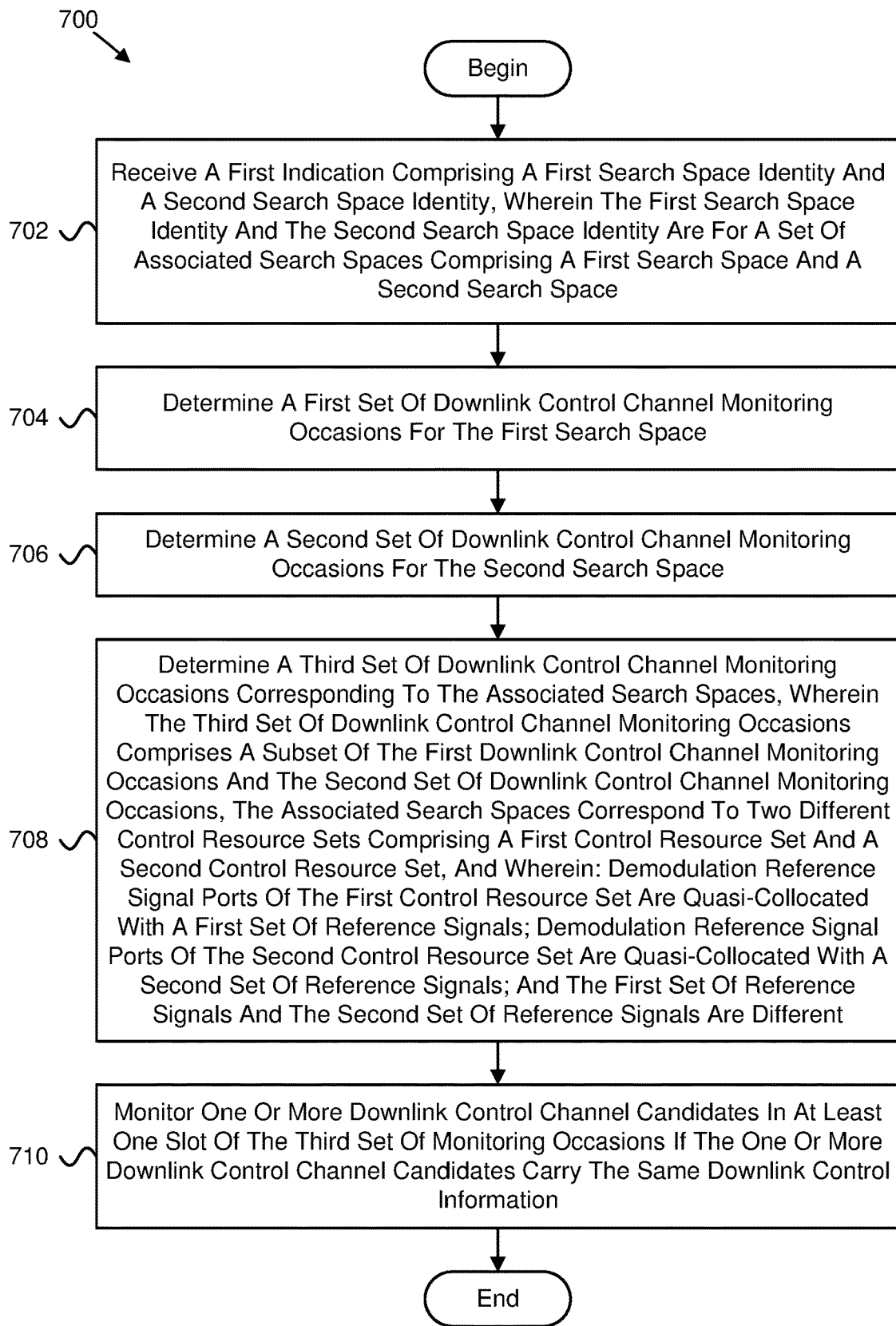
FIG. 7 is a flow chart diagram illustrating another embodiment of a method for downlink assignments for downlink control channels.

FIG. 7 is a flow chart diagram illustrating another embodiment of a method 700 for downlink assignments for downlink control channels. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 a first indication comprising a first search space identity and a second search space identity, wherein the first search space identity and the second search space identity are for a set of associated search spaces comprising a first search space and a second search space. In certain embodiments, the method 700 includes determining 704 a first set of downlink control channel monitoring occasions for the first search space. In various embodiments, the method 700 includes determining 706 a second set of downlink control channel monitoring occasions for the second search space. In some embodiments, the method 700 includes determining 708 a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different. In certain embodiments, the method 700 includes monitoring 710 one or more downlink control channel candidates in at least one slot of the third set of monitoring occasions if the one or more downlink control channel candidates carry the same downlink control information.

In certain embodiments, the method 700 further comprises: receiving a second indication indicating that a transport block of downlink data to be delivered to a user equipment via one or more downlink shared channels at each hybrid automatic repeat request transmission stage; wherein the one or more downlink shared channels are scheduled by one or more corresponding downlink control channels. In some embodiments, if the user equipment receives multiple downlink control channels carrying a same hybrid automatic repeat request process number in the downlink control information within a monitoring occasion window of at least one search space, the user equipment assumes that the multiple downlink control channels schedule multiple associated downlink shared channels carrying the same transport block, and the monitoring occasion window comprises a set of consecutive monitoring occasions comprising at least one monitoring occasion selected from the first set of downlink control channel monitoring occasions, the second set of downlink control channel monitoring occasions, and the third set of downlink control channel monitoring occasions.

In various embodiments, the method 700 further comprises: receiving a third indication indicating multiple hybrid automatic repeat request-acknowledgment resources, wherein each resource of the multiple hybrid automatic repeat request-acknowledgment resources corresponds to a downlink shared channel of the associated downlink shared channels; decoding a first downlink shared channel of the associated downlink shared channel; and, in response to successful decoding of the first downlink shared channel: determining a subset of the multiple hybrid automatic repeat request-acknowledgment resources that occur after a processing delay resulting from processing the first downlink shared channel; selecting a hybrid automatic repeat request-acknowledgment resource from the subset of the multiple hybrid automatic repeat request-acknowledgment resources that has an earliest starting symbol; and transmitting a positive acknowledgment on the hybrid automatic repeat request-acknowledgment resource.

In one embodiment, the method 700 further comprises: receiving a fourth indication indicating a monitoring periodicity; and determining the third set of downlink control channel monitoring occasions corresponding to the associated search spaces based on the monitoring periodicity; wherein: the first search space comprises a first monitoring periodicity and the second search space comprises a second monitoring periodicity; and the monitoring periodicity is larger than the first monitoring periodicity and the second monitoring periodicity.

In certain embodiments, the method 700 further comprises: receiving a fifth indication indicating a duration; determining the third set of downlink control channel monitoring occasions corresponding to the associated search spaces based on the duration, wherein: the first search space comprises a first monitoring periodicity and a first duration, and the second search space comprises a second monitoring periodicity and a second duration; and the duration is different from the first duration and the second duration; and monitoring downlink control channel candidates in the associated search spaces in a number of consecutive slots indicated by the duration.

In some embodiments, the user equipment is configured to: receive a first user equipment indication indicating that a transmission configuration index field is present in downlink control channels of the first control resource set; and receive a second user equipment indication indicating that the transmission configuration index field is present in downlink control channels of the second control resource set; wherein the transmission configuration index field in a downlink control channel provides information on quasi-co-location relationships between downlink reference signals in one reference signal set and the downlink control channel demodulation reference signal ports.

In various embodiments, the method 700 further comprises: monitoring one or more downlink control channel candidates in a first slot of the first set of monitoring occasions; monitoring one or more downlink control channel candidates in a second slot of the second set of monitoring occasions; and assuming that the one or more downlink control channel candidates in the first slot of the first set of monitoring occasions and the one or more downlink control channel candidates in the second slot of the second set of monitoring occasions carry the same downlink control information.

In one embodiment, one or more downlink shared channels are scheduled by one or more corresponding downlink control channels, and the method further comprises: receiving a sixth indication updating an interpretation of a transmission configuration index field in downlink data assignments; and applying the interpretation after a last downlink shared channel reception corresponding to the one or more downlink shared channels.

In certain embodiments: the demodulation reference signal ports of the first control resource set comprise a first set of demodulation reference signal ports and a second set of demodulation reference signal ports; the first set of demodulation reference signal ports are quasi-collocated with the first set of reference signals; and the second set of demodulation reference signal ports are quasi-collocated with a third set of reference signals, and the first and the third sets of reference signals are different.

In one embodiment, a method comprises: monitoring a first downlink control channel candidate associated with scheduling a first downlink data channel in a first control resource set; monitoring a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols; receiving at least one downlink assignment associated with the first downlink control channel candidate or the second downlink control channel candidate; in response to the at least one downlink assignment comprising a first downlink assignment associated with the first downlink control channel candidate: determining a first downlink data channel allocation comprising resources allocated to a first downlink data channel based on the first downlink assignment; determining a first demodulation reference signal symbol location associated with the first downlink data channel based at least in part on the first downlink assignment, the first set of orthogonal frequency-division multiplexing symbols, and the second set of orthogonal frequency-division multiplexing symbols; and decoding the first downlink data channel; and in response to the at least one downlink assignment comprising a second downlink assignment associated with the second downlink control channel candidate: determining a second downlink data channel allocation comprising resources allocated to a second downlink data channel based on the second downlink assignment; determining a second demodulation reference signal symbol location associated with the second downlink data channel based at least in part on the second downlink assignment, the first set of orthogonal frequency-division multiplexing symbols, and the second set of orthogonal frequency-division multiplexing symbols; and decoding the second downlink data channel.

In certain embodiments, the first demodulation reference signal symbol location and the second demodulation reference signal symbol location are the same location.

In some embodiments, at least one of the first downlink data channel allocation and the second downlink data channel allocation collides with resources reserved for at least one of the first control resource set and the second control resource set.

In various embodiments, the first set of orthogonal frequency-division multiplexing symbols and the second set of orthogonal frequency-division multiplexing symbols have a different number of orthogonal frequency-division multiplexing symbols.

In one embodiment, the first downlink data channel allocation and the second downlink data channel allocation overlap.

In certain embodiments, the method further comprises: determining a control resource set of the first control resource set and the second control resource set that ends in a later orthogonal frequency-division multiplexing symbol; determining a first demodulation reference signal symbol associated with the first downlink data channel that occurs immediately after the control resource set; and determining a second demodulation reference signal symbol associated with the second downlink data channel that occurs immediately after the control resource set.

In some embodiments, the method further comprises determining a physical uplink control channel resource for sending an acknowledgement in response to the first downlink data channel and the second downlink data channel, wherein the physical uplink control channel resource is determined based on a frequency location of the at least one downlink assignment within an associated control resource set, the first control resource set comprises a first set of control channel elements, and the second control resource set comprises a second set of control channel elements.

In various embodiments, the at least one downlink assignment comprises the first downlink assignment and the second downlink assignment, and wherein: a first starting control channel element index of the first downlink control channel candidate is in a first half of a first control channel element index of the first control resource set and a second starting control channel element index of the second downlink control channel candidate is in a first half of a second control channel element index of the second control resource set; or the first starting control channel element index is in a second half of the first control channel element index and the second starting control channel element index is in a second half of the second control channel element index.

In one embodiment, a first number of control channel elements in the first set of control channel elements is different from a second number of control channel elements in the second set of control channel elements.

In certain embodiments, the at least one downlink assignment comprises the first downlink assignment and the second downlink assignment, and the physical uplink control channel resource is determined based on the frequency location of the first downlink assignment.

In some embodiments, the first downlink assignment and the second downlink assignment have the same content.

In various embodiments: the first downlink data channel is associated with a first transmission configuration index state and the second downlink data channel is associated with a second transmission configuration index state; the first downlink data channel comprises a third set of orthogonal frequency-division multiplexing symbols, and the second downlink data channel comprises a fourth set of orthogonal frequency-division multiplexing symbols; the first transmission configuration index state and the second transmission configuration index state are different at least if the fourth set of orthogonal frequency-division multiplexing symbols occurs at least 'w' orthogonal frequency-division multiplexing symbols after the last orthogonal frequency-division multiplexing symbol of the third set of orthogonal frequency-division multiplexing symbols, and wherein 'w' is a non-negative number determined by a user equipment; the first transmission configuration index state and the second transmission configuration index state are the same if the fourth set of orthogonal frequency-division multiplexing symbols do not occur at least 'w' orthogonal frequency-division multiplexing symbols after the last orthogonal frequency-division multiplexing symbol of the third set of orthogonal frequency-division multiplexing symbols; and the first transmission configuration index state and the second transmission configuration index state provide information comprising quasi-co-location relationships between downlink reference signals in one reference signal set and demodulation reference signal ports of a corresponding downlink data channel.

In one embodiment: the third set of orthogonal frequency-division multiplexing symbols comprises 2, 4, or 7 orthogonal frequency-division multiplexing symbols; and the fourth set of orthogonal frequency-division multiplexing symbols comprises 2, 4, or 7 orthogonal frequency-division multiplexing symbols.

In certain embodiments, the first control resource set and the second control resource set are the same, and the first downlink assignment and the second downlink assignment are the same.

In some embodiments, the first transmission configuration index state and the second transmission configuration index state are different if the third set of orthogonal frequency-division multiplexing symbols belong to a first slot and the fourth set of orthogonal frequency-division multiplexing symbols belong to a second slot, the first slot and the second slots are different, and a slot is composed of fourteen consecutive orthogonal frequency-division multiplexing symbols with a predetermined starting orthogonal frequency-division multiplexing symbol.

In one embodiment, an apparatus comprises: a processor that: monitors a first downlink control channel candidate associated with scheduling a first downlink data channel in a first control resource set; and monitors a second downlink control channel candidate associated with scheduling a second downlink data channel in a second control resource set, wherein the first control resource set comprises a first set of orthogonal frequency-division multiplexing symbols, and the second control resource set comprises a second set of orthogonal frequency-division multiplexing symbols; and a receiver that receives at least one downlink assignment associated with the first downlink control channel candidate or the second downlink control channel candidate; wherein, in response to the at least one downlink assignment comprising a first downlink assignment associated with the first downlink control channel candidate, the processor: determines a first downlink data channel allocation comprising resources allocated to a first downlink data channel based on the first downlink assignment; determines a first demodulation reference signal symbol location associated with the first downlink data channel based at least in part on the first downlink assignment, the first set of orthogonal frequency-division multiplexing symbols, and the second set of orthogonal frequency-division multiplexing symbols; and decodes the first downlink data channel; and wherein, in response to the at least one downlink assignment comprising a second downlink assignment associated with the second downlink control channel candidate, the processor: determines a second downlink data channel allocation comprising resources allocated to a second downlink data channel based on the second downlink assignment; determines a second demodulation reference signal symbol location associated with the second downlink data channel based at least in part on the second downlink assignment, the first set of orthogonal frequency-division multiplexing symbols, and the second set of orthogonal frequency-division multiplexing symbols; and decodes the second downlink data channel.

In certain embodiments, the first demodulation reference signal symbol location and the second demodulation reference signal symbol location are the same location.

In some embodiments, at least one of the first downlink data channel allocation and the second downlink data channel allocation collides with resources reserved for at least one of the first control resource set and the second control resource set.

In various embodiments, the first set of orthogonal frequency-division multiplexing symbols and the second set of orthogonal frequency-division multiplexing symbols have a different number of orthogonal frequency-division multiplexing symbols.

In one embodiment, the first downlink data channel allocation and the second downlink data channel allocation overlap.

In certain embodiments, the processor: determines a control resource set of the first control resource set and the second control resource set that ends in a later orthogonal frequency-division multiplexing symbol; determines a first demodulation reference signal symbol associated with the first downlink data channel that occurs immediately after the control resource set; and determines a second demodulation reference signal symbol associated with the second downlink data channel that occurs immediately after the control resource set.

In some embodiments, the processor determines a physical uplink control channel resource for sending an acknowledgement in response to the first downlink data channel and the second downlink data channel, the physical uplink control channel resource is determined based on a frequency location of the at least one downlink assignment within an associated control resource set, the first control resource set comprises a first set of control channel elements, and the second control resource set comprises a second set of control channel elements.

In various embodiments, the at least one downlink assignment comprises the first downlink assignment and the second downlink assignment, and wherein: a first starting control channel element index of the first downlink control channel candidate is in a first half of a first control channel element index of the first control resource set and a second starting control channel element index of the second downlink control channel candidate is in a first half of a second control channel element index of the second control resource set; or the first starting control channel element index is in a second half of the first control channel element index and the second starting control channel element index is in a second half of the second control channel element index.

In one embodiment, a first number of control channel elements in the first set of control channel elements is different from a second number of control channel elements in the second set of control channel elements.

In certain embodiments, the at least one downlink assignment comprises the first downlink assignment and the second downlink assignment, and the physical uplink control channel resource is determined based on the frequency location of the first downlink assignment.

In some embodiments, the first downlink assignment and the second downlink assignment have the same content.

In various embodiments: the first downlink data channel is associated with a first transmission configuration index state and the second downlink data channel is associated with a second transmission configuration index state; the first downlink data channel comprises a third set of orthogonal frequency-division multiplexing symbols, and the second downlink data channel comprises a fourth set of orthogonal frequency-division multiplexing symbols; the first transmission configuration index state and the second transmission configuration index state are different at least if the fourth set of orthogonal frequency-division multiplexing symbols occurs at least 'w' orthogonal frequency-division multiplexing symbols after the last orthogonal frequency-division multiplexing symbol of the third set of orthogonal frequency-division multiplexing symbols, and wherein 'w' is a non-negative number determined by a user equipment; the first transmission configuration index state and the second transmission configuration index state are the same if the fourth set of orthogonal frequency-division multiplexing symbols do not occur at least 'w' orthogonal frequency-division multiplexing symbols after the last orthogonal frequency-division multiplexing symbol of the third set of orthogonal frequency-division multiplexing symbols; and the first transmission configuration index state and the second transmission configuration index state provide information comprising quasi-co-location relationships between downlink reference signals in one reference signal set and demodulation reference signal ports of a corresponding downlink data channel.

In one embodiment: the third set of orthogonal frequency-division multiplexing symbols comprises 2, 4, or 7 orthogonal frequency-division multiplexing symbols; and the fourth set of orthogonal frequency-division multiplexing symbols comprises 2, 4, or 7 orthogonal frequency-division multiplexing symbols.

In certain embodiments, the first control resource set and the second control resource set are the same, and the first downlink assignment and the second downlink assignment are the same.

In some embodiments, the first transmission configuration index state and the second transmission configuration index state are different if the third set of orthogonal frequency-division multiplexing symbols belong to a first slot and the fourth set of orthogonal frequency-division multiplexing symbols belong to a second slot, the first slot and the second slots are different, and a slot is composed of fourteen consecutive orthogonal frequency-division multiplexing symbols with a predetermined starting orthogonal frequency-division multiplexing symbol.

In one embodiment, a method comprises: receiving a first indication comprising a first search space identity and a second search space identity, wherein the first search space identity and the second search space identity are for a set of associated search spaces comprising a first search space and a second search space; determining a first set of downlink control channel monitoring occasions for the first search space; determining a second set of downlink control channel monitoring occasions for the second search space; determining a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different; and monitoring one or more downlink control channel candidates in at least one slot of the third set of monitoring occasions if the one or more downlink control channel candidates carry the same downlink control information.

In certain embodiments, the method further comprises: receiving a second indication indicating that a transport block of downlink data to be delivered to a user equipment via one or more downlink shared channels at each hybrid automatic repeat request transmission stage; wherein the one or more downlink shared channels are scheduled by one or more corresponding downlink control channels.

In some embodiments, if the user equipment receives multiple downlink control channels carrying a same hybrid automatic repeat request process number in the downlink control information within a monitoring occasion window of at least one search space, the user equipment assumes that the multiple downlink control channels schedule multiple associated downlink shared channels carrying the same transport block, and the monitoring occasion window comprises a set of consecutive monitoring occasions comprising at least one monitoring occasion selected from the first set of downlink control channel monitoring occasions, the second set of downlink control channel monitoring occasions, and the third set of downlink control channel monitoring occasions.

In various embodiments, the method further comprises: receiving a third indication indicating multiple hybrid automatic repeat request-acknowledgment resources, wherein each resource of the multiple hybrid automatic repeat request-acknowledgment resources corresponds to a downlink shared channel of the associated downlink shared channels; decoding a first downlink shared channel of the associated downlink shared channel; and, in response to successful decoding of the first downlink shared channel: determining a subset of the multiple hybrid automatic repeat request-acknowledgment resources that occur after a processing delay resulting from processing the first downlink shared channel; selecting a hybrid automatic repeat request-acknowledgment resource from the subset of the multiple hybrid automatic repeat request-acknowledgment resources that has an earliest starting symbol; and transmitting a positive acknowledgment on the hybrid automatic repeat request-acknowledgment resource.

In one embodiment, the method further comprises: receiving a fourth indication indicating a monitoring periodicity; and determining the third set of downlink control channel monitoring occasions corresponding to the associated search spaces based on the monitoring periodicity; wherein: the first search space comprises a first monitoring periodicity and the second search space comprises a second monitoring periodicity; and the monitoring periodicity is larger than the first monitoring periodicity and the second monitoring periodicity.

In certain embodiments, the method further comprises: receiving a fifth indication indicating a duration; determining the third set of downlink control channel monitoring occasions corresponding to the associated search spaces based on the duration, wherein: the first search space comprises a first monitoring periodicity and a first duration, and the second search space comprises a second monitoring periodicity and a second duration; and the duration is different from the first duration and the second duration; and monitoring downlink control channel candidates in the associated search spaces in a number of consecutive slots indicated by the duration.

In some embodiments, the user equipment is configured to: receive a first user equipment indication indicating that a transmission configuration index field is present in downlink control channels of the first control resource set; and receive a second user equipment indication indicating that the transmission configuration index field is present in downlink control channels of the second control resource set; wherein the transmission configuration index field in a downlink control channel provides information on quasi-co-location relationships between downlink reference signals in one reference signal set and the downlink control channel demodulation reference signal ports.

In various embodiments, the method further comprises: monitoring one or more downlink control channel candidates in a first slot of the first set of monitoring occasions; monitoring one or more downlink control channel candidates in a second slot of the second set of monitoring occasions; and assuming that the one or more downlink control channel candidates in the first slot of the first set of monitoring occasions and the one or more downlink control channel candidates in the second slot of the second set of monitoring occasions carry the same downlink control information.

In one embodiment, one or more downlink shared channels are scheduled by one or more corresponding downlink control channels, and the method further comprises: receiving a sixth indication updating an interpretation of a transmission configuration index field in downlink data assignments; and applying the interpretation after a last downlink shared channel reception corresponding to the one or more downlink shared channels.

In certain embodiments: the demodulation reference signal ports of the first control resource set comprise a first set of demodulation reference signal ports and a second set of demodulation reference signal ports; the first set of demodulation reference signal ports are quasi-collocated with the first set of reference signals; and the second set of demodulation reference signal ports are quasi-collocated with a third set of reference signals, and the first and the third sets of reference signals are different.

In one embodiment, an apparatus comprises: a receiver that receives a first indication comprising a first search space identity and a second search space identity, wherein the first search space identity and the second search space identity are for a set of associated search spaces comprising a first search space and a second search space; and a processor that: determines a first set of downlink control channel monitoring occasions for the first search space; determines a second set of downlink control channel monitoring occasions for the second search space; determines a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the associated search spaces correspond to two different control resource sets comprising a first control resource set and a second control resource set, and wherein: demodulation reference signal ports of the first control resource set are quasi-collocated with a first set of reference signals; demodulation reference signal ports of the second control resource set are quasi-collocated with a second set of reference signals; and the first set of reference signals and the second set of reference signals are different; and monitors one or more downlink control channel candidates in at least one slot of the third set of monitoring occasions if the one or more downlink control channel candidates carry the same downlink control information.

In certain embodiments: the receiver receives a second indication indicating that a transport block of downlink data to be delivered to the apparatus via one or more downlink shared channels at each hybrid automatic repeat request transmission stage; and the one or more downlink shared channels are scheduled by one or more corresponding downlink control channels.

In some embodiments, if the apparatus receives multiple downlink control channels carrying a same hybrid automatic repeat request process number in the downlink control information within a monitoring occasion window of at least one search space, the apparatus assumes that the multiple downlink control channels schedule multiple associated downlink shared channels carrying the same transport block, and the monitoring occasion window comprises a set of consecutive monitoring occasions comprising at least one monitoring occasion selected from the first set of downlink control channel monitoring occasions, the second set of downlink control channel monitoring occasions, and the third set of downlink control channel monitoring occasions.

In various embodiments, the apparatus further comprises a transmitter, wherein: the receiver receives a third indication indicating multiple hybrid automatic repeat request-acknowledgment resources, wherein each resource of the multiple hybrid automatic repeat request-acknowledgment resources corresponds to a downlink shared channel of the associated downlink shared channels; the processor decodes a first downlink shared channel of the associated downlink shared channel; and, in response to successful decoding of the first downlink shared channel: the processor determines a subset of the multiple hybrid automatic repeat request-acknowledgment resources that occur after a processing delay resulting from processing the first downlink shared channel; the processor selects a hybrid automatic repeat request-acknowledgment resource from the subset of the multiple hybrid automatic repeat request-acknowledgment resources that has an earliest starting symbol; and the transmitter transmits a positive acknowledgment on the hybrid automatic repeat request-acknowledgment resource.

In one embodiment, the receiver receives a fourth indication indicating a monitoring periodicity; and the processor determines the third set of downlink control channel monitoring occasions corresponding to the associated search spaces based on the monitoring periodicity; wherein: the first search space comprises a first monitoring periodicity and the second search space comprises a second monitoring periodicity; and the monitoring periodicity is larger than the first monitoring periodicity and the second monitoring periodicity.

In certain embodiments: the receiver receives a fifth indication indicating a duration; the processor determines the third set of downlink control channel monitoring occasions corresponding to the associated search spaces based on the duration, wherein: the first search space comprises a first monitoring periodicity and a first duration, and the second search space comprises a second monitoring periodicity and a second duration; and the duration is different from the first duration and the second duration; and the processor monitors downlink control channel candidates in the associated search spaces in a number of consecutive slots indicated by the duration.

In some embodiments, the apparatus is configured to: receive a first user equipment indication indicating that a transmission configuration index field is present in downlink control channels of the first control resource set; and receive a second user equipment indication indicating that the transmission configuration index field is present in downlink control channels of the second control resource set; wherein the transmission configuration index field in a downlink control channel provides information on quasi-co-location relationships between downlink reference signals in one reference signal set and the downlink control channel demodulation reference signal ports.

In various embodiments, the processor: monitors one or more downlink control channel candidates in a first slot of the first set of monitoring occasions; monitors one or more downlink control channel candidates in a second slot of the second set of monitoring occasions; and assumes that the one or more downlink control channel candidates in the first slot of the first set of monitoring occasions and the one or more downlink control channel candidates in the second slot of the second set of monitoring occasions carry the same downlink control information.

In one embodiment, one or more downlink shared channels are scheduled by one or more corresponding downlink control channels, and: the receiver receives a sixth indication updating an interpretation of a transmission configuration index field in downlink data assignments; and the processor applies the interpretation after a last downlink shared channel reception corresponding to the one or more downlink shared channels.

In certain embodiments: the demodulation reference signal ports of the first control resource set comprise a first set of demodulation reference signal ports and a second set of demodulation reference signal ports; the first set of demodulation reference signal ports are quasi-collocated with the first set of reference signals; and the second set of demodulation reference signal ports are quasi-collocated with a third set of reference signals, and the first and the third sets of reference signals are different.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving a first indication comprising a first search space identity and a second search space identity, wherein the first search space identity and the second search space identity are for a set of associated search spaces comprising a first search space and a second search space;
determining a first set of downlink control channel monitoring occasions for the first search space;
determining a second set of downlink control channel monitoring occasions for the second search space;
determining a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the first search space corresponds to a first control resource set, and the second search space corresponds to a second control resource set, and wherein:
demodulation reference signal ports of the first control resource set are quasi-collocated with first ports of a first set of reference signals;
demodulation reference signal ports of the second control resource set are quasi-collocated with second ports of a second set of reference signals; and
the first set of reference signals and the second set of reference signals are different; and
monitoring one or more downlink control channel candidates in at least one slot of the third set of monitoring occasions in response to the one or more downlink control channel candidates carrying the same downlink control information.

2. The method of claim 1, further comprising:
receiving a second indication indicating that a transport block of downlink data to be delivered to a user equipment via one or more downlink shared channels at each hybrid automatic repeat request transmission stage;
wherein the one or more downlink shared channels are scheduled by one or more corresponding downlink control channels.

3. The method of claim 2, wherein in response to the user equipment receiving multiple downlink control channels carrying a same hybrid automatic repeat request process number in the downlink control information within a monitoring occasion window of at least one search space, the user equipment assumes that the multiple downlink control channels schedule multiple associated downlink shared channels carrying the same transport block, and the monitoring occasion window comprises a set of consecutive monitoring occasions comprising at least one monitoring occasion selected from the first set of downlink control channel monitoring occasions, the second set of downlink control channel monitoring occasions, and the third set of downlink control channel monitoring occasions.

4. The method of claim 2, further comprising:
receiving a third indication indicating multiple hybrid automatic repeat request-acknowledgment resources, wherein each resource of the multiple hybrid automatic repeat request-acknowledgment resources corresponds to a downlink shared channel of the associated downlink shared channels;
decoding a first downlink shared channel of the associated downlink shared channel; and
in response to successful decoding of the first downlink shared channel:
determining a subset of the multiple hybrid automatic repeat request-acknowledgment resources that occur after a processing delay resulting from processing the first downlink shared channel;
selecting a hybrid automatic repeat request-acknowledgment resource from the subset of the multiple hybrid automatic repeat request-acknowledgment resources that has an earliest starting symbol; and
transmitting a positive acknowledgment on the hybrid automatic repeat request-acknowledgment resource.

5. The method of claim 2, wherein the user equipment is configured to:
receive a first user equipment indication indicating that a transmission configuration index field is present in downlink control channels of the first control resource set; and
receive a second user equipment indication indicating that the transmission configuration index field is present in downlink control channels of the second control resource set;
wherein the transmission configuration index field in a downlink control channel provides information on quasi-co-location relationships between downlink reference signals in one reference signal set and the downlink control channel demodulation reference signal ports.

6. The method of claim 1, further comprising:
receiving a fourth indication indicating a monitoring periodicity; and
determining the third set of downlink control channel monitoring occasions corresponding to the associated search spaces based on the monitoring periodicity;
wherein:
the first search space comprises a first monitoring periodicity and the second search space comprises a second monitoring periodicity; and
the monitoring periodicity is larger than the first monitoring periodicity and the second monitoring periodicity.

7. The method of claim 1, further comprising:
receiving a fifth indication indicating a duration;
determining the third set of downlink control channel monitoring occasions corresponding to the associated search spaces based on the duration, wherein:
the first search space comprises a first monitoring periodicity and a first duration, and the second search space comprises a second monitoring periodicity and a second duration; and
the duration is different from the first duration and the second duration; and
monitoring downlink control channel candidates in the associated search spaces in a number of consecutive slots indicated by the duration.

8. The method of claim 1, further comprising:
monitoring one or more downlink control channel candidates in a first slot of the first set of monitoring occasions;
monitoring one or more downlink control channel candidates in a second slot of the second set of monitoring occasions; and
assuming that the one or more downlink control channel candidates in the first slot of the first set of monitoring occasions and the one or more downlink control channel candidates in the second slot of the second set of monitoring occasions carry the same downlink control information.

9. The method of claim 8, wherein one or more downlink shared channels are scheduled by one or more corresponding downlink control channels, and the method further comprises:
receiving a sixth indication updating an interpretation of a transmission configuration index field in downlink data assignments; and
applying the interpretation after a last downlink shared channel reception corresponding to the one or more downlink shared channels.

10. The method of claim 1, wherein:
the demodulation reference signal ports of the first control resource set comprise a first set of demodulation reference signal ports and a second set of demodulation reference signal ports;
the first set of demodulation reference signal ports are quasi-collocated with the first set of reference signals; and
the second set of demodulation reference signal ports are quasi-collocated with a third set of reference signals, and the first and the third sets of reference signals are different.

11. An apparatus comprising:
a receiver that receives a first indication comprising a first search space identity and a second search space identity, wherein the first search space identity and the second search space identity are for a set of associated search spaces comprising a first search space and a second search space; and
a processor that:

determines a first set of downlink control channel monitoring occasions for the first search space;

determines a second set of downlink control channel monitoring occasions for the second search space;

determines a third set of downlink control channel monitoring occasions corresponding to the associated search spaces, wherein the third set of downlink control channel monitoring occasions comprises a subset of the first downlink control channel monitoring occasions and the second set of downlink control channel monitoring occasions, the first search space corresponds to a first control resource set, and the second search space corresponds to a second control resource set, and wherein:

demodulation reference signal ports of the first control resource set are quasi-collocated with first ports of a first set of reference signals;

demodulation reference signal ports of the second control resource set are quasi-collocated with second ports of a second set of reference signals; and the first set of reference signals and the second set of reference signals are different; and monitors one or more downlink control channel candidates in at least one slot of the third set of monitoring occasions in response to the one or more downlink control channel candidates carrying the same downlink control information.

12. The apparatus of claim 11, wherein:
the receiver receives a second indication indicating that a transport block of downlink data to be delivered to the apparatus via one or more downlink shared channels at each hybrid automatic repeat request transmission stage; and the one or more downlink shared channels are scheduled by one or more corresponding downlink control channels.

13. The apparatus of claim 12, wherein in response to the apparatus receiving multiple downlink control channels carrying a same hybrid automatic repeat request process number in the downlink control information within a monitoring occasion window of at least one search space, the apparatus assumes that the multiple downlink control channels schedule multiple associated downlink shared channels carrying the same transport block, and the monitoring occasion window comprises a set of consecutive monitoring occasions comprising at least one monitoring occasion selected from the first set of downlink control channel monitoring occasions, the second set of downlink control channel monitoring occasions, and the third set of downlink control channel monitoring occasions.

14. The apparatus of claim 12, further comprising a transmitter, wherein:
the receiver receives a third indication indicating multiple hybrid automatic repeat request-acknowledgment resources, wherein each resource of the multiple hybrid automatic repeat request-acknowledgment resources corresponds to a downlink shared channel of the associated downlink shared channels;

the processor decodes a first downlink shared channel of the associated downlink shared channel; and in response to successful decoding of the first downlink shared channel:

the processor determines a subset of the multiple hybrid automatic repeat request-acknowledgment resources that occur after a processing delay resulting from processing the first downlink shared channel;

the processor selects a hybrid automatic repeat request-acknowledgment resource from the subset of the multiple hybrid automatic repeat request-acknowledgment resources that has an earliest starting symbol; and the transmitter transmits a positive acknowledgment on the hybrid automatic repeat request-acknowledgment resource.

15. The apparatus of claim 12, wherein the apparatus is configured to:
receive a first user equipment indication indicating that a transmission configuration index field is present in downlink control channels of the first control resource set; and receive a second user equipment indication indicating that the transmission configuration index field is present in downlink control channels of the second control resource set;

wherein the transmission configuration index field in a downlink control channel provides information on quasi-co-location relationships between downlink reference signals in one reference signal set and the downlink control channel demodulation reference signal ports.

16. The apparatus of claim 11, wherein:
the receiver receives a fourth indication indicating a monitoring periodicity; and the processor determines the third set of downlink control channel monitoring occasions corresponding to the associated search spaces based on the monitoring periodicity;

wherein:
the first search space comprises a first monitoring periodicity and the second search space comprises a second monitoring periodicity; and the monitoring periodicity is larger than the first monitoring periodicity and the second monitoring periodicity.

17. The apparatus of claim 11, wherein:
the receiver receives a fifth indication indicating a duration;

the processor determines the third set of downlink control channel monitoring occasions corresponding to the associated search spaces based on the duration, wherein:

the first search space comprises a first monitoring periodicity and a first duration, and the second search space comprises a second monitoring periodicity and a second duration; and the duration is different from the first duration and the second duration; and the processor monitors downlink control channel candidates in the associated search spaces in a number of consecutive slots indicated by the duration.

18. The apparatus of claim 11, wherein the processor:
monitors one or more downlink control channel candidates in a first slot of the first set of monitoring occasions;

monitors one or more downlink control channel candidates in a second slot of the second set of monitoring occasions; and assumes that the one or more downlink control channel candidates in the first slot of the first set of monitoring occasions and the one or more downlink control channel candidates in the second slot of the second set of monitoring occasions carry the same downlink control information.

19. The apparatus of claim 18, wherein one or more downlink shared channels are scheduled by one or more corresponding downlink control channels, and:
- the receiver receives a sixth indication updating an interpretation of a transmission configuration index field in downlink data assignments; and
- the processor applies the interpretation after a last downlink shared channel reception corresponding to the one or more downlink shared channels.

20. The apparatus of claim 11, wherein:
- the demodulation reference signal ports of the first control resource set comprise a first set of demodulation reference signal ports and a second set of demodulation reference signal ports;
- the first set of demodulation reference signal ports are quasi-collocated with the first set of reference signals; and
- the second set of demodulation reference signal ports are quasi-collocated with a third set of reference signals, and the first and the third sets of reference signals are different.

\* \* \* \* \*